US012627388B2

(12) United States Patent
Kumar et al.

(10) Patent No.: US 12,627,388 B2
(45) Date of Patent: May 12, 2026

(54) METHODS, DEVICES, AND SYSTEMS FOR DISTRIBUTING CONTENT IN COMMUNITY OF OVER-THE-AIR BROADCAST CONTENT RECEIVERS

(71) Applicant: DISH Network Technologies India Private Limited, Bangalore (IN)

(72) Inventors: Amit Kumar, Bangalore (IN); Gopikumar Ranganathan, Bangalore (IN); Rakesh Eluvan, Bangalore (IN)

(73) Assignee: DISH NETWORK TECHNOLOGIES INDIA PRIVATE LIMITED, Bangalore (IN)

( * ) Notice: Subject to any disclaimer, the term of this patent is extended or adjusted under 35 U.S.C. 154(b) by 0 days.

(21) Appl. No.: 19/068,460

(22) Filed: Mar. 3, 2025

(65) Prior Publication Data

US 2025/0202607 A1 Jun. 19, 2025

Related U.S. Application Data

(62) Division of application No. 17/558,369, filed on Dec. 21, 2021, now Pat. No. 12,267,149.

(51) Int. Cl.
*H04H 60/43* (2008.01)
*H04H 60/29* (2008.01)
(Continued)

(52) U.S. Cl.
CPC ............ *H04H 60/43* (2013.01); *H04H 60/29* (2013.01); *H04H 60/37* (2013.01); *H04H 60/79* (2013.01)

(58) Field of Classification Search
None
See application file for complete search history.

(56) References Cited

U.S. PATENT DOCUMENTS 8,646,016 B2 * 2/2014 Kubat ................ H04N 21/4622 725/110
8,847,754 B2 * 9/2014 Buchheim ............... G01S 1/725 455/457
(Continued)

FOREIGN PATENT DOCUMENTS

CA 2864775 A1 * 8/2013 ......... H04L 43/0852
CA 2983137 A1 * 4/2018
(Continued)

*Primary Examiner* — Ricky Chin
(74) *Attorney, Agent, or Firm* — Seed Intellectual Property Law Group LLP

(57) ABSTRACT

A method of providing channel content in a broadcast content reception and distribution system includes: receiving, by a broadcast content reception device, information that identifies a channel that provides channel content, from a content player device; receiving, by the broadcast content reception device, a signal that transmits the channel content, from an antenna; receiving, by the broadcast content reception device, information that indicates a signal strength corresponding to the channel based on the signal that transmits the channel content received from the antenna; determining, by the broadcast content reception device, that the signal strength is less than or equal to a threshold value based on the information that indicates the signal strength; and transmitting, by the broadcast content reception device, a message to the content player device in response to the determining that the signal strength is less than or equal to the threshold value.

20 Claims, 17 Drawing Sheets

(51) Int. Cl.
*H04H 60/37* (2008.01)
*H04H 60/79* (2008.01)

(56) References Cited

U.S. PATENT DOCUMENTS 8,997,154 B2 * 3/2015 Ansari ............... H04N 21/6405 707/723
9,491,504 B1 * 11/2016 Nijim ................. H04N 21/4383
10,021,429 B1 * 7/2018 Talvensaari ............. H04L 65/80
10,123,076 B2 * 11/2018 Dey ................... H04N 21/6181
10,305,951 B1 * 5/2019 Jorgovanovic ........ H04L 65/612
10,412,746 B2 * 9/2019 Taghavi Nasrabadi ...................... H04W 24/10
10,630,395 B1 * 4/2020 Chukka ................. H04W 24/02
10,681,416 B2 * 6/2020 Yamamoto ......... H04N 21/2662
10,729,975 B1 * 8/2020 Windrem ................ A63F 13/48
10,880,840 B1 * 12/2020 Mansour ............. H04W 52/367
10,944,632 B2 * 3/2021 Tzoreff ................. H04W 76/19
10,965,986 B2 * 3/2021 Kumar ............. H04N 21/44209
11,140,457 B1 * 10/2021 Jordan ............. H04N 21/64707
11,191,013 B1 * 11/2021 Kalkunte .............. H04W 48/16
11,265,752 B1 * 3/2022 Marupaduga ..... H04W 36/0085
11,632,683 B2 * 4/2023 Panaitopol ............ H04W 84/18 370/252
2003/0158958 A1 * 8/2003 Chiu .................. H04N 21/8358 709/217
2004/0122741 A1 * 6/2004 Sidman .................. G06Q 10/10 705/26.1
2006/0193292 A1 * 8/2006 Bansal .................... H04L 47/11 370/465
2006/0212542 A1 * 9/2006 Fang ..................... H04L 67/104 709/219
2007/0277205 A1 * 11/2007 Grannan ............ H04N 21/4826 725/86
2009/0168689 A1 * 7/2009 Itagaki ................ H04W 72/542 370/315
2010/0011088 A1 * 1/2010 Gautier ................... H04L 67/55 709/217
2010/0058405 A1 * 3/2010 Ramakrishnan ... H04N 21/4856 725/100
2010/0100911 A1 * 4/2010 Ramakrishnan ............................ H04N 21/47202 725/98
2010/0161752 A1 * 6/2010 Collet ................... H04L 67/104 709/216
2010/0218209 A1 * 8/2010 Kendall ............... G08B 27/008 725/33
2011/0010453 A1 * 1/2011 Roy ...................... G06F 21/335 709/240
2011/0099228 A1 * 4/2011 Smith .................. H04N 21/632 711/159
2011/0111772 A1 * 5/2011 Tysowski .............. G01S 5/0244 455/456.3
2012/0134390 A1 * 5/2012 Smadi .................... H04B 1/715 375/E1.033
2012/0303764 A1 * 11/2012 Ibenforth ................ H04W 4/20 709/219
2013/0007186 A1 * 1/2013 Liu ..................... H04L 67/1046 709/213
2013/0225095 A1 * 8/2013 Hong ..................... H04B 15/00 455/73
2015/0089536 A1 * 3/2015 Byerley ............. H04N 21/4532 725/28
2015/0092708 A1 * 4/2015 Su ......................... H04W 76/16 370/329
2015/0117247 A1 * 4/2015 Wang .................... H04W 76/14 370/252
2016/0127850 A1 * 5/2016 Kao ........................ H04W 4/70 370/328
2016/0241279 A1 * 8/2016 Yang .................... H01Q 1/1257
2017/0063643 A1 * 3/2017 Lee ....................... H04L 47/122
2017/0332146 A1 * 11/2017 Klappert ............ H04N 21/2665
2017/0366235 A1 * 12/2017 Kim ..................... H04B 7/0626
2018/0091243 A1 * 3/2018 Xu ......................... H04H 40/90
2018/0352029 A1 * 12/2018 Roy ....................... G06Q 10/10
2019/0020845 A1 * 1/2019 Golobrodsky ....... H04N 21/658
2019/0132422 A1 * 5/2019 Garcia Duran ....... H04L 67/101
2019/0297546 A1 * 9/2019 Likar .................. H04B 17/327
2019/0327510 A1 * 10/2019 Kalagi ............. H04N 21/44209
2020/0221186 A1 * 7/2020 Shambro, Jr. ...... H04N 21/2223
2020/0314938 A1 * 10/2020 Nguyen .................. H04W 4/14
2020/0374586 A1 * 11/2020 Kumar ............. H04N 21/44209
2021/0112219 A1 * 4/2021 Petruzzelli ........... H04B 17/318
2021/0194951 A1 * 6/2021 Dai ....................... H04L 67/568
2021/0211493 A1 * 7/2021 Dai ..................... H04L 67/1065
2021/0259034 A1 * 8/2021 Damnjanovic ....... H04W 24/02
2021/0289246 A1 * 9/2021 Wang ............... H04N 21/26208
2021/0360328 A1 * 11/2021 Guajardo ....... H04N 21/440218
2021/0400107 A1 * 12/2021 Dai ..................... H04L 67/1063
2022/0046072 A1 * 2/2022 Long .................... G06Q 20/223
2022/0131936 A1 * 4/2022 Ahn ........................ H04L 45/22
2022/0377567 A1 * 11/2022 Yeddala ................ H04W 16/18
2022/0386112 A1 * 12/2022 Hurwitz .............. H04W 12/033
2022/0417817 A1 * 12/2022 Wang ................ H04W 36/0058
2023/0198645 A1 * 6/2023 Kumar ................... H04H 60/29 725/14
2025/0202607 A1 * 6/2025 Kumar ................... H04H 60/43

FOREIGN PATENT DOCUMENTS

CA 3065161 A1 * 12/2018 ......... H04N 21/4383
CA 3097144 A1 * 10/2019 ............. H04Q 11/02

* cited by examiner

METHODS, DEVICES, AND SYSTEMS FOR DISTRIBUTING CONTENT IN COMMUNITY OF OVER-THE-AIR BROADCAST CONTENT RECEIVERS

BACKGROUND

Technical Field

The present disclosure relates in general to audiovisual content distribution, and, in particular to methods, devices, and systems for distributing content in a community of over-the-air broadcast content receivers.

Description of the Related Art

High-definition television (HDTV) digital broadcasting provides superior picture and audio quality compared to traditional standard-definition television (SDTV) broadcasting. A device that receives HDTV content via HDTV digital broadcasting can stream the received HDTV content to various client devices (e.g., cellular telephones, computers, and smart televisions) that have an appropriate application installed for receiving the streamed content. For example, Dish Network and Sling TV currently provide AirTV devices (e.g., AirTV 2 devices) that can stream HDTV content received on local HDTV channels to client devices that support the Sling app. Such devices may stream HDTV content in real time to one or more client devices while the HDTV content is being received via an HDTV antenna. Additionally, such devices may provide digital video recorder (DVR) functionality that enables HDTV content received via an HDTV antenna to be recorded and subsequently streamed to a client device in response to a request from the client device.

HDTV digital broadcasting has several limitations due to the nature of terrestrial systems that broadcast HDTV signals. For example, terrestrial broadcasting systems typically transmit radio frequency (RF) signals from antenna towers that are located in different geographical regions. An HDTV receiver is able to receive HDTV content that is broadcast using HDTV signals transmitted by a local antenna used by a television station only if the HDTV signals transmitted by the local antenna are received by the HDTV receiver with a signal strength that is sufficiently high for the HDTV receiver to decode the HDTV signals. Thus, users of HDTV digital broadcasting can watch HDTV content only if the HDTV content is broadcast in the user's local region. For example, an HDTV receiver that is coupled to an antenna located in New York City is not able to receive an HDTV signal that is broadcast from an antenna located in the San Francisco Bay Area.

Even if an HDTV antenna is able to receive an HDTV signal that is broadcast from a local antenna, the received HDTV signal may not have a sufficient signal strength to enable an HDTV receiver that is connected to the HDTV antenna to obtain HDTV content from the received HDTV signal. The signal strength of HDTV broadcast signals at an HDTV receiver may be unacceptable for a number of reasons. For example, electromagnetic interference (EMI) caused by nearby power lines and electronic devices may cause the signal strength of an HDTV signal at an HDTV receiver to be unacceptably low. Also, multipath interference caused by RF signals being reflected off of objects (e.g., buildings) may cause the signal strength of an HDTV signal at an HDTV receiver to be unacceptably low. In addition, large amounts of moisture in the air may (e.g., from heavy fog, high humidity, or intense rain or snow) may cause the signal strength of an HDTV signal at an HDTV receiver to be unacceptably low.

Additionally, a user of HDTV digital broadcasting may have trouble getting all local channels that are available in the user's local region with good signal quality because of the location of the user's home relative to the various locations of each antenna that is used to broadcast HDTV signals. It may be difficult to place an antenna that receives HDTV signals at an optimum location relative to the location of a particular antenna used to broadcast HDTV signals due to the layout or setup of the user's home or the area surrounding the user's home. Also, an optimum location to place an HDTV antenna in order to receive HDTV signals that are broadcast from a first antenna used by a first television station with a maximum signal strength may not be the same location at which HDTV signals that are broadcast from a second antenna used by a second television station are received with a maximum signal strength. Accordingly, users who infrequently watch local HDTV channels may not want to invest the time, money, and effort required to set up an HDTV antenna and associated equipment.

BRIEF SUMMARY

The present disclosure improves conventional content distribution technologies by providing methods, devices, and systems that enable content received via over-the-air (OTA) broadcast signals to be shared among devices located in broadcast regions that are geographically dispersed. For example, the present disclosure improves conventional HDTV digital broadcasting technology by providing methods, devices, and systems that enable a first broadcast content reception device that receives HDTV signals via a first HDTV antenna located in a first region of a country (e.g., New York City) to share locally received broadcast HDTV content with a second broadcast content reception device that receives HDTV signals via a second HDTV antenna located in a second region of the country (e.g., San Francisco Bay Area), which is not possible using conventional HDTV OTA broadcast content reception and distribution systems.

According to the present disclosure, a broadcast content reception device that is unable to receive a particular HDTV content item due to insufficient signal strength of a received HDTV signal can automatically obtain that HDTV content item from another broadcast content reception device in a community of broadcast content reception devices.

In addition, according to the present disclosure, a user can be provided with a single, merged list of local channels that are available from across a community of users located in geographically dispersed regions, for example, spanning multiple zip codes or states. Filters may be used for better classification content included in geographically diverse HDTV channels. For example, the merged list of channels may group together news content items (e.g., programs, broadcasts, episodes, etc.) from geographically diverse HDTV channels so that a user can quickly view all news content items that are available for viewing. Similarly, the merged list of channels may group together sports content items from geographically diverse HDTV channels so that a user can quickly view all sports content items that is available for viewing.

A method of providing channel content in a broadcast content reception and distribution system according to the present disclosure may be characterized as including: receiving, by a first broadcast content reception device, information that identifies a channel that provides channel content, from a content player device; receiving, by the first broadcast content reception device, a signal that transmits the channel content, from an antenna; receiving, by the first broadcast content reception device, information that indicates a signal strength corresponding to the channel, the information that indicates the signal strength corresponding to the channel being based on the signal that transmits the channel content received from the antenna; determining, by the first broadcast content reception device, that the signal strength is less than or equal to a threshold value based on the information that indicates the signal strength corresponding to the channel; and transmitting, by the first broadcast content reception device, a message to the content player device in response to the determining that the signal strength corresponding to the channel is less than or equal to the threshold value.

The method may further include receiving, by the content player device, the message from the first broadcast content reception device; transmitting, by the content player device, a request for channel information to a community server device in response to the receiving the message from the broadcast content reception device; receiving, by the content player device, information that identifies a second broadcast content reception device from the community server device; transmitting, by the content player device, a request for the channel content to the second broadcast content reception device; and receiving, by the content player device, the channel content from the second broadcast content reception device.

The method may further include tuning, by the first broadcast content reception device, a receiver based on the information that indicates the channel in response to the receiving the information that indicates the channel.

The method may further include transmitting, by the first broadcast content reception device, the channel content based on the signal that transmits the channel content received from the antenna, to the content player device; and stopping, by the first broadcast content reception device, the transmitting the channel content based on the signal that transmits the channel content received from the antenna in response to the determining that the signal strength corresponding to the channel is less than or equal to the threshold value.

The method may further include transmitting, by the first broadcast content reception device, a request for channel information to a community server device in response to the determining that the signal strength corresponding to the channel is less than or equal to the threshold value; receiving, by the first broadcast content reception device, information that identifies a second broadcast content reception device from the community server device; transmitting, by the first broadcast content reception device, a request for the channel content using the information that identifies the second broadcast content reception device received from the community server device, to the second broadcast content reception device; receiving, by the first broadcast content reception device, the channel content from the second broadcast content reception device; and storing, by the first broadcast content reception device, the channel content received from the second broadcast content reception device. The method may further include transmitting, by the first broadcast content reception device, the channel content received from the second broadcast content reception device to the content player device.

The method may further include receiving, by the first broadcast content reception device, a request for channel information from a community server device; tuning, by the first broadcast content reception device, a receiver in response to the receiving the request for channel information from the community server device; storing, by the first broadcast content reception device, information that indicates one or more signal strengths corresponding to one or more channels based on the tuning; and transmitting, by the first broadcast content reception device, a response to the request for channel information including the information that indicates the one or more signal strengths corresponding to the one or more channels to the community server device.

A broadcast content reception device according to the present disclosure may be characterized as including a receiver which, in operation, receives a signal that transmits channel content, from an antenna; a first transceiver; a second transceiver; a processor coupled to the receiver, the first transceiver, and the second transceiver; and a memory storing instructions that, when executed by the processor, cause the processor to: receive via the first transceiver information that identifies a channel that provides channel content, from a content player device; receive information that indicates a signal strength corresponding to the channel, the information that indicates the signal strength corresponding to the channel being based on the signal that transmits the channel content received from the antenna; determine that the signal strength is less than or equal to a threshold value based on the information that indicates the signal strength; transmit via the first transceiver or the second transceiver a message to the content player device in response to the determining that the signal strength is less than or equal to the threshold value.

The instructions, when executed by the processor, may cause the processor to tune the receiver based on the information that indicates the channel in response to the first transceiver receiving the information that indicates the channel.

The instructions, when executed by the processor, may cause the processor to include information that identifies a community of broadcast content reception devices in the message transmitted to the content player device in response to the determining that the signal strength is less than or equal to the threshold value.

The instructions, when executed by the processor, may cause the processor to: transmit the channel content to the content player device based on the signal that transmits the channel content received from the antenna; and stop transmission of the channel content based on the signal that transmits the channel content received from the antenna in response to the determining that the signal strength is less than or equal to the threshold value.

The instructions, when executed by the processor, may cause the processor to: transmit a request for channel information to a community server device in response to the determining that the signal strength is less than or equal to the threshold value; receive information that identifies another broadcast content reception device from the community server device; transmit a request for the channel content to the other broadcast content reception device using the information that identifies the other broadcast content reception device received from the community server device; receive the channel content from the other broadcast content reception device; and store the channel content received from the other broadcast content reception device. The instructions, when executed by the processor, may cause the processor to transmit the channel content received from the other broadcast content reception device to the content player device.

The instructions, when executed by the processor, may cause the processor to: receive via the first transceiver a request for channel information from a community server device; tune the receiver in response to the receiving the request for channel information; store information that indicates one or more signal strengths corresponding to one or more channels based on the receiver being tuned in response to the receiving the request for channel information; and transmit via the first transceiver a response to the request for channel information including the information that indicates the one or more signal strengths corresponding to the one or more channels to the community server device.

A community server device that communicates with a plurality of broadcast content reception devices according to the present disclosure may be characterized as including: a transceiver; a processor coupled to the transceiver; and a memory storing instructions that, when executed by the processor, cause the processor to: store community information including information that identifies each of the plurality of broadcast content reception devices and information that identifies a community of broadcast content reception devices; receive via the transceiver a first request for channel information from a first one of the broadcast content reception devices included in the community of broadcast content reception devices, the first request for channel information including information that identifies a channel; transmit via the transceiver a second request for channel information to one or more of the broadcast content reception devices included in the community of broadcast content reception devices other than the first one of the broadcast content reception devices using the community information in response to receiving the first request for channel information, the second request for channel information including the information that identifies the channel included in the first request for channel information; receive via the transceiver information that indicates a signal strength corresponding to the channel from each of the one or more of the broadcast content reception devices included in the community of broadcast content reception devices other than the first one of the broadcast content reception devices; select a selected one of the one or more of the broadcast content reception devices included in the community of broadcast content reception devices other than the first one of the broadcast content reception devices based on the information that indicates the signal strength corresponding to the channel received from each of the one or more of the broadcast content reception devices included in the community of broadcast content reception devices other than the first one of the broadcast content reception devices; and transmit via the transceiver information that identifies the selected one of the one or more of the broadcast content reception devices included in the community of broadcast content reception devices other than the first one of the broadcast content reception devices to the first one of the broadcast content reception devices.

The memory may store information that indicates a number of content items currently being provided via to a network by each of the one or more of the broadcast content reception devices included in the community of broadcast content reception devices other than the first one of the broadcast content reception devices or information that indicates a data rate associated with each of the one or more of the broadcast content reception devices included in the community of broadcast content reception devices other than the first one of the broadcast content reception devices, and the instructions, when executed by the processor, may cause the processor to select the selected one of the one or more of the broadcast content reception devices included in the community of broadcast content reception devices other than the first one of the broadcast content reception devices based on (i) the information that indicates the signal strength corresponding to the channel received from each of the one or more of the broadcast content reception devices included in the community of broadcast content reception devices other than the first one of the broadcast content reception devices, and (ii) the information that indicates the number of content items currently being provided via to the network by each of the one or more of the broadcast content reception devices included in the community of broadcast content reception devices other than the first one of the broadcast content reception devices or the information that indicates the data rate associated with each of the one or more of the broadcast content reception devices included in the community of broadcast content reception devices other than the first one of the broadcast content reception devices.

The instructions, executed by the processor, may cause the processor transmit the information that identifies the channel included in the first request for channel information with the information that identifies the selected one of the one or more of the broadcast content reception devices included in the community of broadcast content reception devices other than the first one of the broadcast content reception devices to the first one of the broadcast content reception devices.

The request for channel information may include the information that identifies the community of broadcast content reception devices, and the instructions, when executed by the processor, may cause the processor to: obtain the community information using the information that identifies the community of broadcast content reception devices; obtain information that identifies the one or more of the broadcast content reception devices included in the community of broadcast content reception devices other than the first one of the broadcast content reception devices from the community information, and transmit the second request for channel information to the one or more of the broadcast content reception devices included in the community of broadcast content reception devices other than the first one of the broadcast content reception devices using the information that identifies the one or more of the broadcast content reception devices included in the community of broadcast content reception devices other than the first one of the broadcast content reception devices.

The instructions, when executed by the processor, may cause the processor to: receive via the transceiver a third request for channel information from a second one of the broadcast content reception devices included in the community of broadcast content reception devices; transmit via the transceiver one or more fourth requests for channel information to one or more of the broadcast content reception devices included in the community of broadcast content reception devices other than the second one of the broadcast content reception devices in response to receiving the third request for channel information; receive via the transceiver information that indicates one or more signal strengths corresponding to one or more channels from each of the one or more of the broadcast content reception devices included in the community of broadcast content reception devices other than the second one of the broadcast content reception devices; generate a content list including information that identifies a plurality of content items based on the information that indicates the one or more signal strengths corresponding to the one or more channels received from each of the one or more of the broadcast content reception devices included in the community of broadcast content reception devices other than the second one of the broadcast content reception devices; and transmit via the transceiver the content list to the second one of the broadcast content reception devices. The instructions, when executed by the processor, cause the processor to: obtain information that identifies a plurality of genres respectively corresponding to the plurality of content items, and arrange the information that identifies the plurality of content items included in the content list based on the information that identifies the plurality of genres respectively corresponding to the plurality of content items, wherein the content items that respectively corresponding to each of the genres are grouped together in the information that identifies the plurality of content items included in the content list.

DETAILED DESCRIPTION

Figure 1:
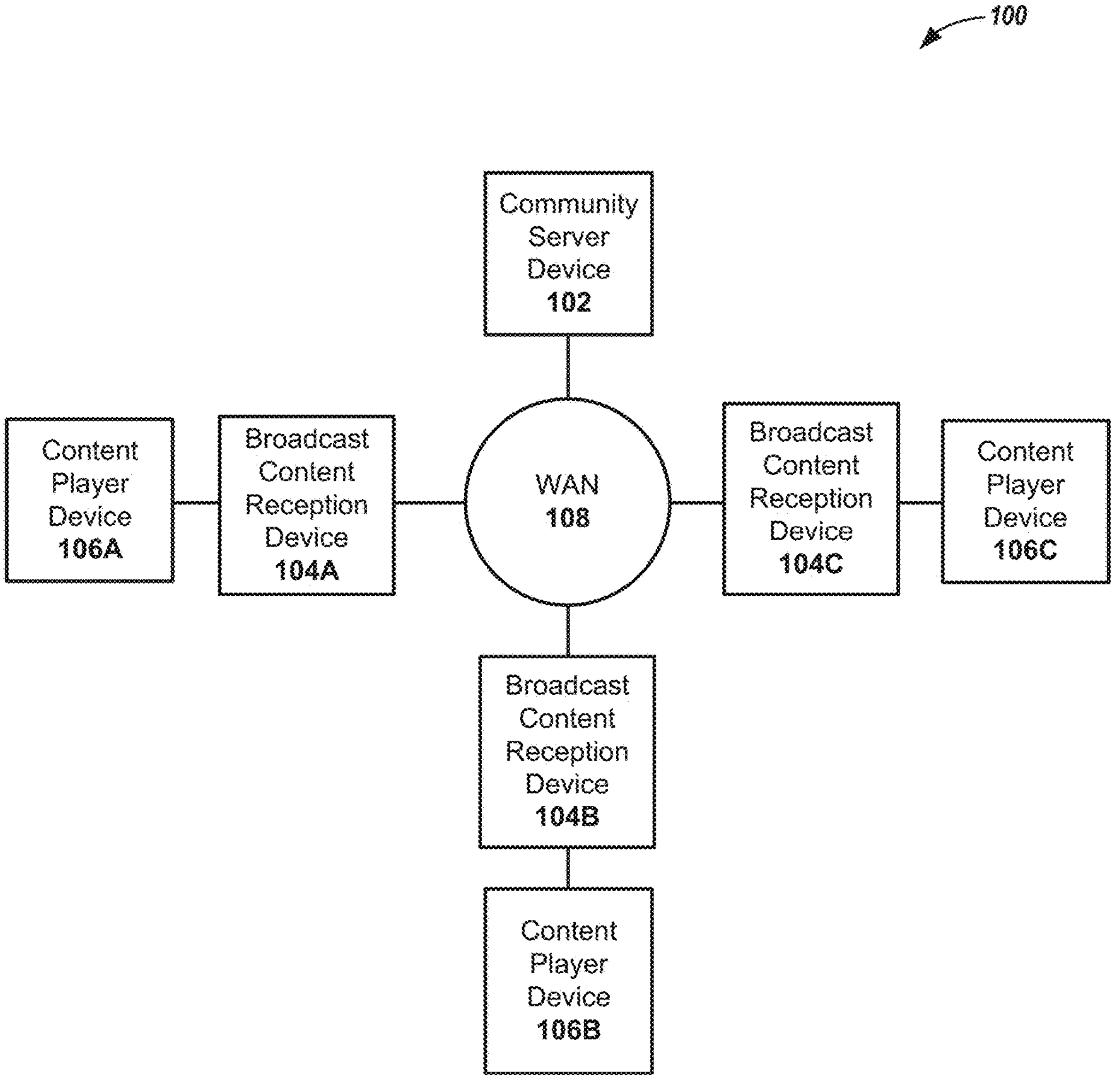
FIG. 1 is a simplified block diagram of an over-the-air (OTA) broadcast content reception and distribution system according to one or more embodiments of the present disclosure.

FIG. 1 is a simplified block diagram of an over-the-air (OTA) broadcast content reception and distribution system 100 according to one or more embodiments of the present disclosure. In general, the OTA broadcast content reception and distribution system 100 includes a plurality of broadcast content reception devices, each of which is configured to receive OTA broadcast signals, and share content obtained from those signals with content player devices and other broadcast content reception devices. For illustrative simplicity, the OTA broadcast content reception and distribution system 100 shown in FIG. 1 includes only three broadcast content reception devices and three corresponding content player devices; however, the OTA broadcast content reception and distribution system 100 can include fewer or more broadcast content reception devices and content player devices without departing from the scope of the present disclosure.

Each of the broadcast content reception devices the OTA broadcast content reception and distribution system 100 shown in FIG. 1 is configured to receive HDTV broadcast signals. Each HDTV broadcast signal is transmitted from an antenna used by a television station that provides a particular television channel. In addition, each of the broadcast content reception devices is configured to share content obtained using the HDTV broadcast signal (i.e., HDTV content) with other broadcast content reception devices and content player devices.

More particularly, the OTA broadcast content reception and distribution system 100 shown in FIG. 1 includes a community server device 102, a broadcast content reception device 104A, a broadcast content reception device 104B, and a broadcast content reception device 104C. In addition, the OTA broadcast content reception and distribution system 100 includes a content player device 106A, a content player device 106B, a content player device 106C, and a content player device 106D. Each of the broadcast content reception devices 104A-104C can provide HDTV content to a respective one of the content player devices 106A-106C over a local area network (LAN). For example, each of the broadcast content reception devices 104A-104C can stream HDTV content to a respective one of the content player devices 106A-106C using a wired LAN such an Ethernet-based network, or a wireless LAN (WLAN) such as a Wi-Fi network.

In addition, the broadcast content reception devices 104A-104C form a community in which HDTV content is shared. For example, HDTV content received at a first one of the broadcast content reception devices 104A-104C can be provided to a second one of the broadcast content reception devices 104A-104C, which may store the HDTV content and provide the HDTV content to a respective one of the content player devices 106A-106C. The broadcast content reception devices 104A-104C can communicate with each other using a wide area network (WAN) 108, for example, using Internet Protocol (IP) communication protocol standards (e.g., IP, TCP, UDP). In one or more implementations, the WAN 108 includes the Internet.

Figure 2:
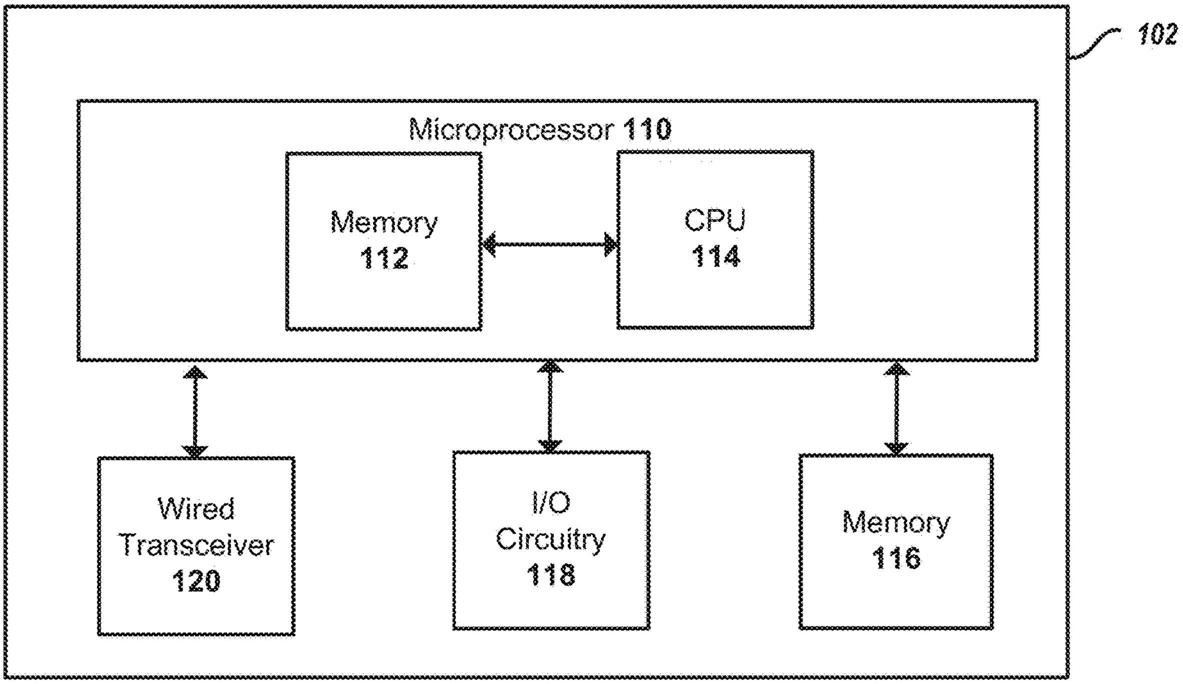
FIG. 2 is a simplified block diagram of a community server device included in the OTA broadcast content reception and distribution system shown in FIG. 1 according to one or more embodiments of the present disclosure.

FIG. 2 is a simplified block diagram of the community server device 102 included in the OTA broadcast content reception and distribution system 100 shown in FIG. 1, according to one or more embodiments of the present disclosure. The community server device 102 includes a microprocessor 110, which includes a memory 112 and a processor or central processing unit (CPU) 114, a memory 116, input/output (I/O) circuitry 118, and a wired transceiver 120.

In one or more embodiments, the memory 116 stores processor-executable instructions that, when executed by the microprocessor 110, cause the community server device 102 to perform the functions of the community server device 102 described herein. The CPU 114 of the microprocessor 110 uses the memory 112 as a working memory while executing the instructions. In one or more embodiments, the memory 112 is comprised of one or more random access memory (RAM) modules. In one or more embodiments, the memory 116 is comprised of one or more non-volatile random access memory (NVRAM) modules, such as electronically erasable programmable read-only memory (EEPROM) or Flash memory modules, for example.

In one or more embodiments, the I/O circuitry 118 includes buttons, switches, dials, knobs, a mouse, touch-screen display device, or other user-interface elements for providing input to the community server device 102. The I/O circuitry 118 also may include a speaker, one or more light emitting devices, or other user-interface elements for outputting information or indications from the community server device 102. The I/O circuitry 118 may include one or more data interfaces, for example, a universal serial bus (USB) interface.

In one or more embodiments, the wired transceiver 120 is coupled to an eight-pin RJ45 connector configured to be coupled to an Ethernet cable through which messages are shared with the broadcast content reception devices 104A-104C. In one or more implementations, the wired transceiver 120 is configured to transmit and receive data signals in accordance with the Institute of Electrical and Electronics Engineers (IEEE) 802.3 communication standards. The wired transceiver 120 may be configured to transmit and receive signals in accordance with other communications standards without departing from the scope of the present disclosure.

Figure 3:
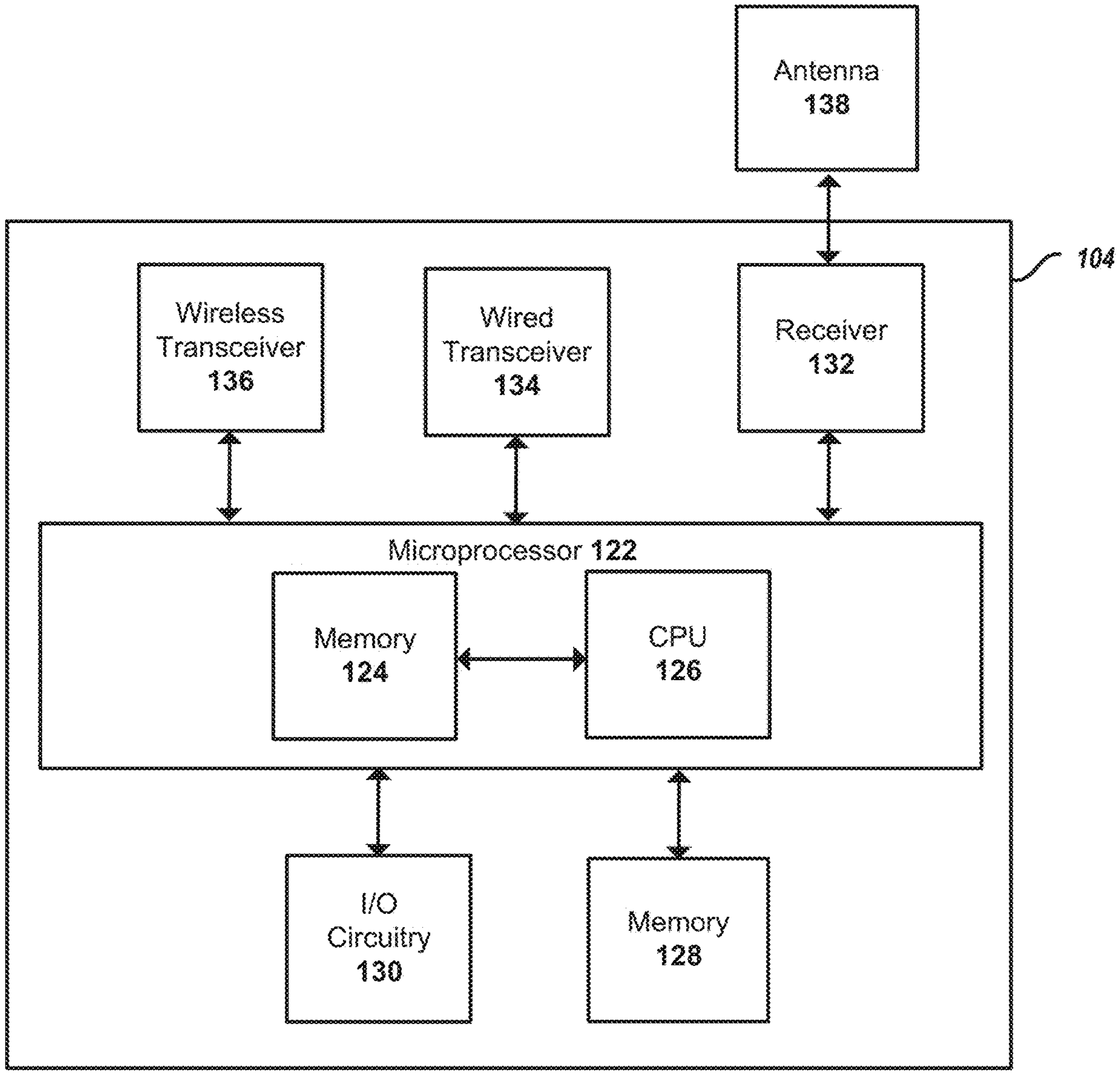
FIG. 3 is a simplified block diagram of a broadcast content reception device included in the OTA broadcast content reception and distribution system shown in FIG. 1 according to one or more embodiments of the present disclosure.

FIG. 3 is a simplified block diagram of a broadcast content reception device 104 corresponding to the broadcast content reception devices 104A-104C included in the OTA broadcast content reception and distribution system 100 shown in FIG. 1, according to one or more embodiments of the present disclosure. The broadcast content reception device 104 includes a microprocessor 122, which includes a memory 124 and a processor or CPU 126, a memory 128, I/O circuitry 130, a receiver 132, a wired transceiver 134, and a wireless transceiver 136.

In one or more embodiments, the memory 128 stores processor-executable instructions that, when executed by the microprocessor 122, cause the broadcast content reception device 104 to perform the functions of the broadcast content reception device 104 described herein. The CPU 126 of the microprocessor 122 uses the memory 124 as a working memory while executing the instructions. In one or more embodiments, the memory 124 is comprised of one or more RAM modules. In one or more embodiments, the memory 128 is comprised of one or more NVRAM modules, such EEPROM or Flash memory modules, for example.

In one or more embodiments, the I/O circuitry 130 includes buttons, switches, dials, knobs, or other user-interface elements for providing input to the broadcast content reception device 104. The I/O circuitry 130 also may include a speaker, one or more light emitting devices, or other user-interface elements for outputting information or indications from the broadcast content reception device 104. The I/O circuitry 130 may include one or more data interfaces, for example, a universal serial bus (USB) interface for connecting an external hard drive to the broadcast content reception device 104, which is used to store digital content items recorded using a DVR feature.

In one or more embodiments, the receiver 132 is an HDTV receiver. For example, the receiver 132 includes a connector configured to be coupled to a coaxial cable through which HDTV broadcast signals are received from an external over-the-air HDTV antenna 138. In one or more embodiments, the external antenna 138 is an HDTV antenna that is configured to receive HDTV broadcast signals.

In one or more implementations, the receiver 132 is a superheterodyne receiver that includes a tuner having a local oscillator that outputs a signal having a particular frequency, which corresponds to a particular channel and is based on a control signal received from the microprocessor 122. The tuner mixes the signal output by the local oscillator with the signal that transmits the channel content received from the external antenna 138, filters the resulting signal using a bandpass filter, and provides the resulting signal to demultiplexer circuitry and signal strength detection circuitry. The demultiplexer circuitry outputs video signals to an image decoder and also outputs audio signals to an audio decoder, which provide their respective outputs to the microprocessor 122. The signal strength detection circuitry provides to the microprocessor 122 an output (e.g., one or more signals) indicating a signal strength of the signal that is input to the signal strength detection circuity.

In one or more implementations, the output of the signal strength detection circuity indicates the signal strength as an absolute number, for example, in units of decibels (dB) milliwatt (dBm), wherein the number is negative and the closer the number is to 0 dBm (e.g., the higher the number), the better the signal strength of the HDTV signal detected by the signal strength detection circuity. In one or more implementations, the output of the signal strength detection circuity indicates a relative index, such as a received signal strength indicator (RSSI) value that varies value between a minimum value (e.g., 0, 1) and a maximum number (e.g., 60, 100, 255) depending on the strength of the signal that is input to the signal strength detection circuity.

In one or more implementations, the wired transceiver 134 is coupled to an eight-pin RJ45 connector configured to be coupled to an Ethernet cable that is also coupled to a modem (e.g., cable modem or digital subscriber line (DSL) modem) that is configured to connect the broadcast content reception device 104 to the WAN 108 shown in FIG. 1. The wired transceiver 134 is configured to transmit and receive data signals in accordance with the Institute of Electrical and Electronics Engineers (IEEE) 802.3 communication standards. The wired transceiver 134 may be configured to transmit and receive signals in accordance with other communications standards without departing from the scope of the present disclosure.

In one or more embodiments, the wireless transceiver 136 includes at least one antenna that is configured to transmit and receive wireless signals in a particular RF band (e.g., 2.4 gigahertz (134 millimeter) ultra high frequency (UHF) band, or 5 gigahertz (60 millimeter) super high frequency (SHF) band). The wireless transceiver 136 is configured to transmit and receive RF signals via the at least one antenna in accordance with one or more of the IEEE 802.11 communication standards (e.g., 802.12A, 802.12B, 802.11g, 802.11n). The wireless transceiver 136 may be configured to transmit and receive signals in accordance with other communication standards without departing from the scope of the present disclosure. In one or more embodiments, the wireless transceiver 136 includes multiple wireless transceivers, for example, a wireless transceiver configured to communicate using Bluetooth communications and a second wireless transceiver configured to communicate using Wi-Fi communications. In one or more implementations, the wireless transceiver 136 is wirelessly coupled to the modem that is configured to connect the broadcast content reception device 104 to the WAN 108.

Figure 4:
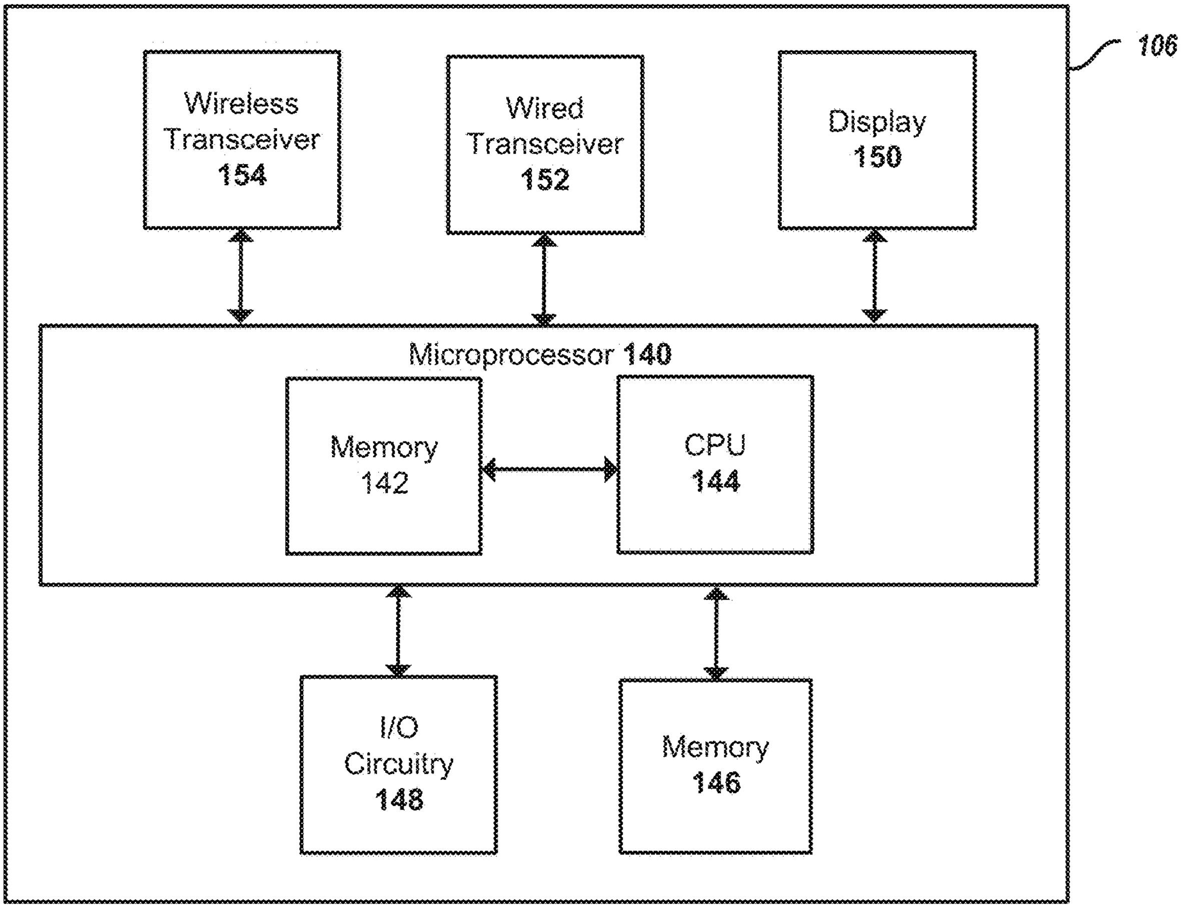
FIG. 4 is a simplified block diagram of a content player device included in the OTA broadcast content reception and distribution system shown in FIG. 1 according to one or more embodiments of the present disclosure.

FIG. 4 is a simplified block diagram of a content player device 106 corresponding to the content player devices 106A-106C included in the OTA broadcast content reception and distribution system 100 shown in FIG. 1, according to one or more embodiments of the present disclosure. The content player device 106 includes a microprocessor 140, which includes a memory 142 and a processor or CPU 144, a memory 146, input/output (I/O) circuitry 148, a display 150, a wired transceiver 152, and a wireless transceiver 154.

In one or more embodiments, the memory 146 stores processor-executable instructions that, when executed by the microprocessor 140, cause the content player device 106 to perform the functions of the content player device 106 described herein. The CPU 144 of the microprocessor 140 uses the memory 142 as a working memory while executing the instructions. In one or more embodiments, the memory 142 is comprised of one or more RAM modules. In one or more embodiments, the memory 146 is comprised of one or more NVRAM modules, such as EEPROM or Flash memory modules, for example.

In one or more embodiments, the I/O circuitry 148 includes buttons, switches, dials, knobs, or other user-interface elements for providing input to the content player device 106. The I/O circuitry 148 include one or more speakers, and may include one or more light emitting devices, or other user-interface elements for outputting information or indications from the content player device 106. The I/O circuitry 148 may include one or more data interfaces, for example, a universal serial bus (USB) interface.

In one or more embodiments, the display 150 is a liquid crystal display. The microprocessor 140 controls the display 150 to display channel content, such as a movie, a game, a news broadcast, etc., which is provided to the content player device 106 by a broadcast content reception device 104.

In one or more implementations, the wired transceiver 152 is coupled to an eight-pin RJ45 connector configured to be coupled to an Ethernet cable that is also coupled to a modem (e.g., cable modem or digital subscriber line (DSL) modem) that is configured to connect the content player device 106 to the WAN 108 shown in FIG. 1. The wired transceiver 152 is configured to transmit and receive data signals in accordance with the Institute of Electrical and Electronics Engineers (IEEE) 802.3 communication standards. The wired transceiver 152 may be configured to transmit and receive signals in accordance with other communications standards without departing from the scope of the present disclosure.

In one or more embodiments, the wireless transceiver 154 includes at least one antenna that is configured to transmit and receive wireless signals in a particular RF band (e.g., 2.4 gigahertz (152 millimeter) UHF band, or 5 gigahertz (60 millimeter) SHF band). The wireless transceiver 154 is configured to transmit and receive RF signals via the at least one antenna in accordance with one or more of the IEEE 802.11 communication standards (e.g., 802.12A, 802.12B, 802.11g, 802.11n). The wireless transceiver 154 may be configured to transmit and receive signals in accordance with other communication standards without departing from the scope of the present disclosure. In one or more embodiments, the wireless transceiver 154 includes multiple wireless transceivers, for example, a wireless transceiver configured to communicate using Bluetooth communications and a second wireless transceiver configured to communicate using Wi-Fi communications. In one or more implementations, the wireless transceiver 154 is wirelessly coupled to a modem that is configured to connect the content player device 106 to the WAN 108.

Having described the structure of the community server device 102, the broadcast content reception device 104, and the content player device 106, various functions of the community server device 102, the broadcast content reception device 104, and the content player device 106 will now be described.

In one or more implementations, the community server device 102 stores instructions (e.g., one or more computer programs) that enable it to manage one or more groups or communities of the broadcast content reception devices 104A-104C. In various implementations, the community server device 102 operates as a web server that provides web pages which enable users of the broadcast content reception devices 104A-104C to create communities of broadcast content reception devices, and also enables those users to join and leave those communities by managing membership of those communities. For example, a first community may include broadcast content reception devices 104A-104C, and a second community may include broadcast content reception devices 104A and 104B. The community server device 102 stores community information related to communities that are created, and performs various other functions and services described herein, for example, in connection with FIGS. 5-7. In one or more implementations, the community server device 102 includes a plurality of server devices, for example, operated by a distributor of the broadcast content reception devices 104A-104C (e.g., Sling TV).

Figure 5:
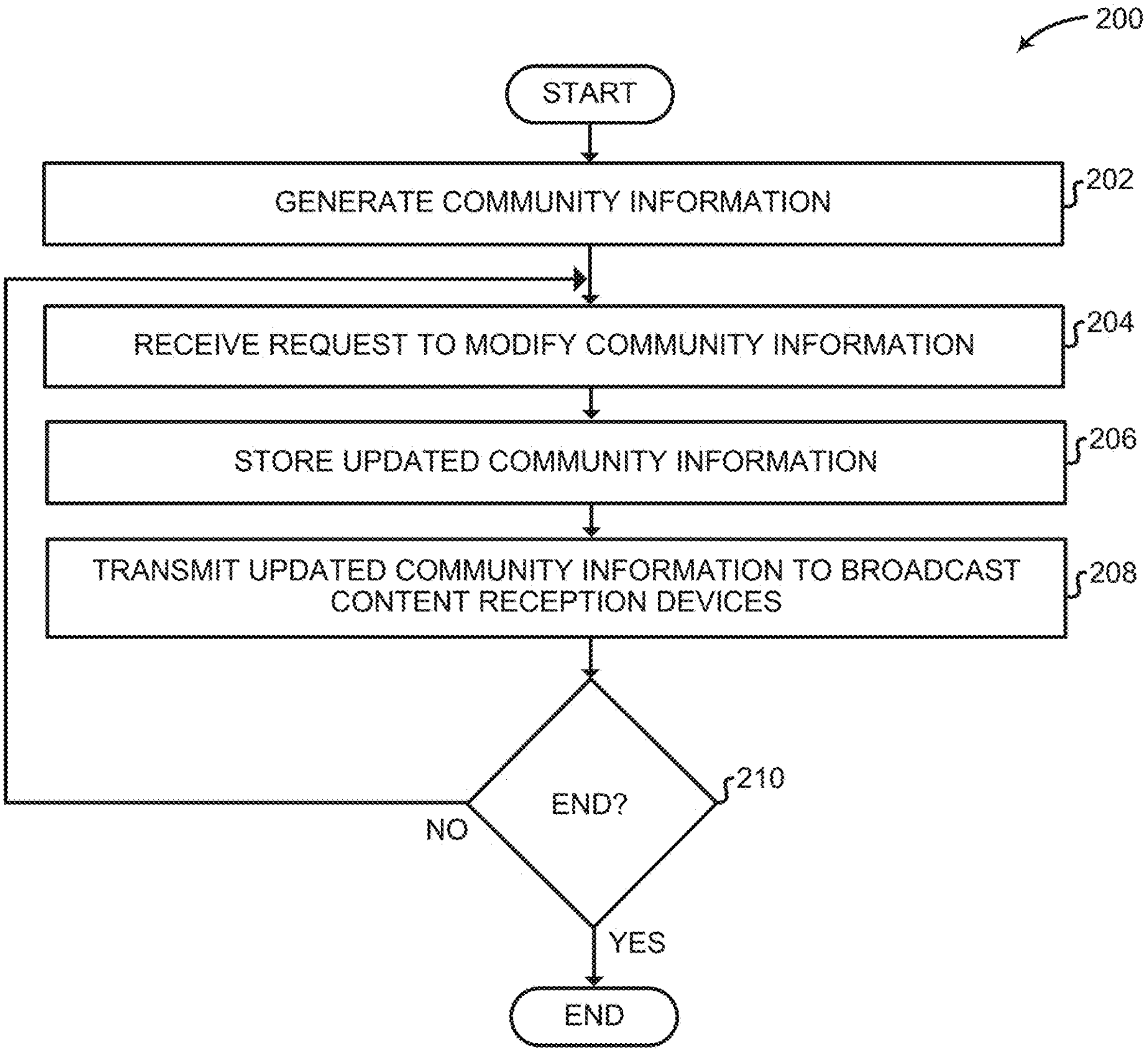
FIG. 5 shows a flowchart of a method performed by a community server device according to one or more embodiments of the present disclosure.

FIG. 5 shows a flowchart of a method 200 performed by the community server device 102 according to one or more embodiments of the present disclosure. The method 200 begins at 202.

At 202, the community server device 102 generates community information. For example, at 202, the community server device 102 generates the community information in response to a user of the broadcast content reception device 104A using a web browser provided by the content player device 106A (e.g., the user's cellphone) to access a webpage provided by the community server device 102. The user of the broadcast content reception device 104A may select an icon on the webpage for creating a new community, which results in the webpage displaying a form through which the user can enter information about the new community, information about the broadcast content reception device 104A, and information about the user's preferences. For example, the user may provide a name for the new community, a user name, a zip code in which the broadcast content reception device 104A is located, an IP address through which the broadcast content reception device 104A can be accessed via the WAN 108, a maximum upload speed or data rate at which the broadcast content reception device 104A will share content items over the WAN 108, a type or a model or a particular capability of the broadcast content reception device 104A, a type or speed of a data connection between the content reception device 104A and the WAN 108, a maximum number of simultaneous streams of content that the broadcast content reception device 104A will provide over the WAN 108, a maximum amount of data per unit of time (e.g., megabytes per second) that the broadcast content reception device 104A will provide over the WAN 108, etc. The community server device 102 generates the community information by associating an alphanumeric community identifier that uniquely identifies the community with the information provided by the user of the broadcast content reception device 104A, and stores the resulting information (e.g., in memory 116). The method 200 then proceeds to 204.

At 204, the community server device 102 receives a request to modify the community information. For example, at 204, the community server device 102 receives a request to modify the new community created by the user of the broadcast content reception device 104A at 202, in response to a user of the broadcast content reception device 104B using a web browser provided by the user's cellphone to access the webpage provided by the community server device 102. The user of the broadcast content reception device 104B may select an icon on the webpage for joining a selected community, which results in the webpage displaying a form through which the user can enter information about the broadcast content reception device 104B and information about the user's preferences. For example, the user may provide a user name, a zip code in which the broadcast content reception device 104B is located, an IP address through which the broadcast content reception device 104B can be accessed via the WAN 108, a maximum upload speed or data rate at which the broadcast content reception device 104B will share content items over the WAN 108, a type or a model or a particular capability of the broadcast content reception device 104B, a type or speed of a data connection between the content reception device 104B and the WAN 108, a maximum number of simultaneous streams of content that the broadcast content reception device 104B will provide over the WAN 108, a maximum amount of data per unit of time (e.g., megabytes per second) that the broadcast content reception device 104B will provide over the WAN 108 etc. The method 200 then proceeds to 206.

At 206, the community server device 102 updates the community information. For example, at 206, in response to receiving a request to join the new community from the user of the broadcast content reception device 104B at 204, the community server device 102 adds the information provided by the user of the broadcast content reception device 104B to the community information generated at 202. The method 200 then proceeds to 208.

At 208, the community server device 102 transmits updated community information to a community of broadcast content reception devices. For example, at 208, the community server device 102 transmits the information that is stored at 206 to the broadcast content reception device 104A via the WAN 108 using the address for the broadcast content reception device 104A included in the channel information, and also transmits the information that is updated at 206 to the broadcast content reception device 104B via the WAN 108 using the address for the broadcast content reception device 104B included in the channel information. The method 200 then proceeds to 210.

At 210, the community server device 102 determines whether the method 200 is to end. For example, at 210, the community server device 102 determines whether a shutdown command has been received at 210. If the community server device 102 determines "YES" the method 200 is to end at 210, the method 200 ends. If the community server device 102 determines "NO" the method 200 is not to end at 210, the method returns to 204 and continues when another request to modify a community is received.

Figure 6:
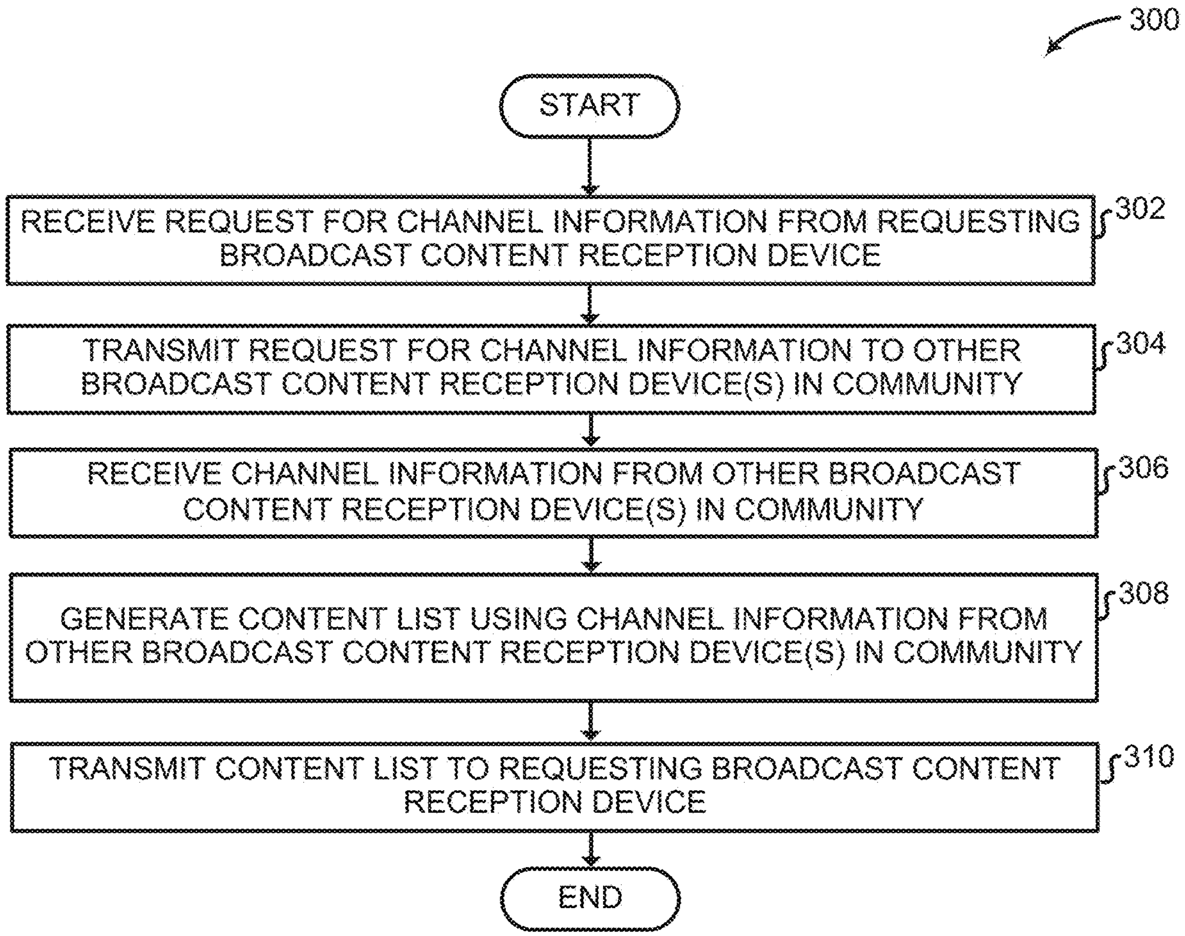
FIG. 6 shows a flowchart of a method performed by a community server device according to one or more embodiments of the present disclosure.

FIG. 6 shows a flowchart of a method 300 performed by the community server device 102 according to one or more embodiments of the present disclosure. The method 300 begins at 302.

At 302, the community server device 102 receives a request for channel information from a requesting broadcast content reception device. For example, the community server device 102 receives via the WAN 108 a request message from the broadcast content reception device 104A that includes the IP address of the broadcast content reception device 104A and the community identifier of the new community created by the user of the broadcast content reception device 104A. The method 300 then proceeds to 304.

At 304, the community server device 102 transmits a request for channel information to other broadcast content reception device(s) in a community. For example, at 304, the community server device 102 transmits via the WAN 108 a request message to the broadcast content reception device 104B that includes the community identifier of the new community created by the user of the broadcast content reception device 104A. Because the community server device 102 may store a plurality of sets of community information respectively corresponding to a plurality of communities, the community server device 102 may obtain a particular set of community information that includes the community identifier and information that identifies the other broadcast content reception device(s) (e.g., IP addresses) using the community identifier included in the request for channel information received at 302, and obtain the information that identifies the other broadcast content reception device(s) (e.g., IP addresses) from that particular set of community information. The method 300 then proceeds to 306.

At 306, the community server device 102 receives channel information from other broadcast content reception device(s) in the community. For example, at 306, the community server device 102 receives via the WAN 108 a response message from the broadcast content reception device 104B, wherein the response message includes a list of channel identifiers and corresponding signal strengths, as described in connection with FIG. 8. The method 300 then proceeds to 308.

At 308, the community server device 102 generates a content list based on channel information received at 306. For example, the community server device 102 queries one or more databases (local or remote) that store content information for content items that are broadcast on each of a plurality of channels in a plurality of broadcasting regions. By way of example, the community server device 102 obtains the zip code associated with the broadcast content reception device 104B in the community information, and performs a series of queries for content information (e.g., name of a television program, genre, unique identifier of television program, etc.) using the zip code and each channel identifier included in the response message from the broadcast content reception device 104B. The method 300 then proceeds to 310.

If the community server device 102 receives a plurality of channel information responses from a plurality of broadcast content reception device (e.g., broadcast content reception devices 104A-104C) at 306, the community server device 102 performs the querying described above for each channel information response. When generating the content list at 308, the community server device 102 may filter the information resulting from the querying so that channel information can be presented to a user in in a convenient form.

For example, the community server device 102 may sort, filter, or group the content items by genre (e.g., news, sports, weekly series, movies, documentary, for children, etc.) so that content items of each genre available from the broadcast content reception device 104A are grouped with other content items of that genre which are available from the broadcast content reception device 104B and the broadcast content reception device 104C. Accordingly, a user that has requested channel information can quickly browse content items by genre, without having to sequentially scroll through all the content items of various genres available from each broadcast content reception device in the community. Other filter types and classifications may be used to arrange content lists without departing from the scope of the present disclosure.

At 310, the community server device 102 transmits the content list generated at 308 to the requesting broadcast content reception device. For example, at 310, the community server device 102 transmits via the WAN 108 a message to the broadcast content reception device 104A that includes the content list generated at 308. The method 300 then ends.

Figure 7:
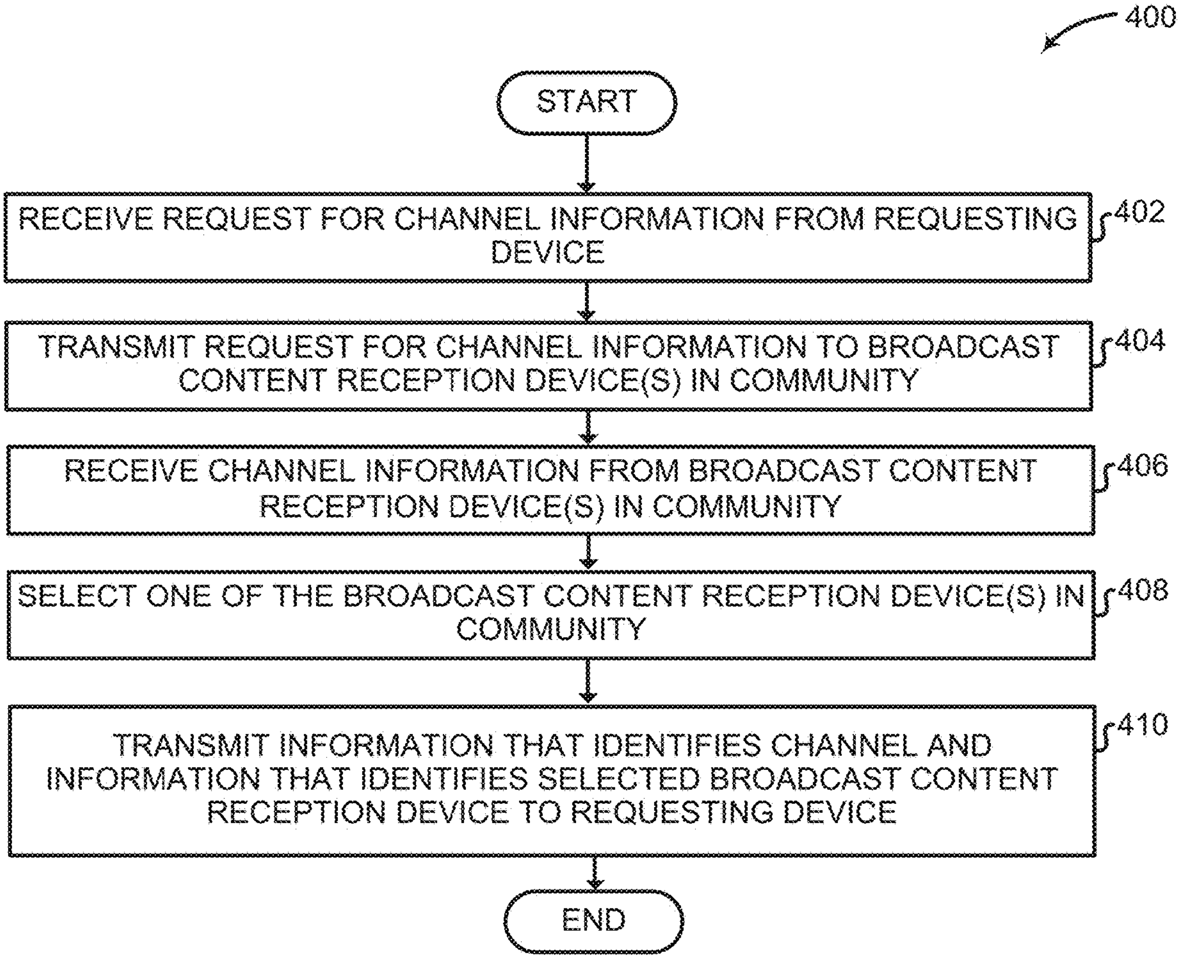
FIG. 7 shows a flowchart of a method performed by a community server device according to one or more embodiments of the present disclosure.

FIG. 7 shows a flowchart of a method 400 performed by the community server device 102 according to one or more embodiments of the present disclosure. The method 400 begins at 402.

At 402, the community server device 102 receives a request for channel information from a requesting device. For example, at 402, the community server device 102 receives via the WAN 108 a request message from the broadcast content reception device 104A that includes the IP address of the broadcast content reception device 104A, the community identifier of the new community created by the user of the broadcast content reception device 104A, and channel information (e.g., name of channel, unique alphanumeric identifier of channel, channel identifier, name of content item, unique alphanumeric identifier of content item, etc.). It is noted that, at 402, the community server device 102 may receive via the WAN 108 a request message from a content player device. For example, at 402, the community server device 102 receives via the WAN 108 a request message from the content player device 106A including information that identifies the broadcast content reception device 104A (e.g., IP address of broadcast content reception device 104A), the community identifier of the new community created by the user of the broadcast content reception device 104A, and channel information (e.g., name of channel, unique alphanumeric identifier of channel, channel identifier, name of content item, unique alphanumeric identifier of content item, etc.). The method 400 then proceed to 404.

At 404, the community server device 102 transmits a request for channel information to one or more broadcast content reception devices in a community. For example, at 404, the community server device 102 transmits via the WAN 108 a request for channel information message to one or more broadcast content reception devices included in the community that is identified by the community identifier included in the request message from the broadcast content reception device 104A received at 402 (e.g., broadcast content reception device 104B), wherein the request for channel information message includes the channel information (e.g., channel identifier) included in the request for channel information received from the broadcast content reception device 104A received at 402. The method 400 then proceeds to 406.

At 406, the community server device 102 receives channel information from each of the one or more broadcast content reception devices in the community. For example, at 406, the community server device 102 receives via the WAN 108 a response message from the broadcast content reception device 104B, wherein the response message includes the channel information (e.g., channel identifier) included in the request for channel information from the broadcast content reception device 104A received at 402 and signal strength information regarding the strength of a broadcast signal corresponding to the channel information (e.g., channel identifier) that is received at the broadcast content reception device 104B. The method 400 then proceed to 408.

At 408, the community server device 102 selects one of the one or more broadcast content reception devices in the community based on the channel information received at 406. For example, the community server device 102 selects the broadcast content reception device (e.g., broadcast content reception device 104B) that provided a channel information response including signal strength information that indicates a highest signal strength.

By way of example, the signal strength information may indicate a received signal strength in dBm and the community server device 102 may store information regarding the signal strength ranges and corresponding values shown in Table 1. The community server device 102 may determine which of the ranges of signal strengths shown in Table 1 the received signal strength information falls within, and associate the corresponding value with an identifier of the broadcast content reception device that provided the strength information at 406. The community server device 102 may select the broadcast content reception device at 408 by selecting the broadcast content reception device to which the highest value has been associated.

TABLE 1

| Signal Strength (dBm) | Characterization | Value |
|---|---|---|
| −40 to −50 | Too Strong | 2 |
| −51 to −65 | Strong | 4 |
| −66 to −80 | Moderate | 3 |
| −81 to −87 | Weak | 1 |
| −88 to −95 | No Signal | 0 |

In one or more embodiments, the broadcast content reception device periodically provides statistical information to the community server device 102, for example, in response to a request from the community server device 102. The community server device 102 may store and analyze the statistical information (e.g., including WAN utilization) regarding the broadcast content reception devices. The community server device 102 may select the broadcast content reception device at 408 using the signal strength information received at 406, stored statistical information, and other factors such as the maximum number of streams each broadcast content reception device is configured to share at one time, the maximum percentage of available bandwidth each broadcast content reception device is configured to use for sharing or has actually used for sharing during a given period of time, the maximum data rate at which each device is configured to use for sharing or has actually used for sharing during a given period of time, etc. A numeric weight may be assigned to each criterion in an equation, which the community server device 102 evaluates in order to select the broadcast content reception device at 408.

At 410, the community server device 102 transmits information that identifies the channel and the broadcast content reception device selected at 408 to the requesting device. For example, at 410, the community server device 102 transmits via the WAN 108 a message to the broadcast content reception device 104A that includes information that identifies the channel corresponding to the request for channel information received at 402 and information that identifies the broadcast content reception device selected at 408. The method 400 then ends.

Figure 8:
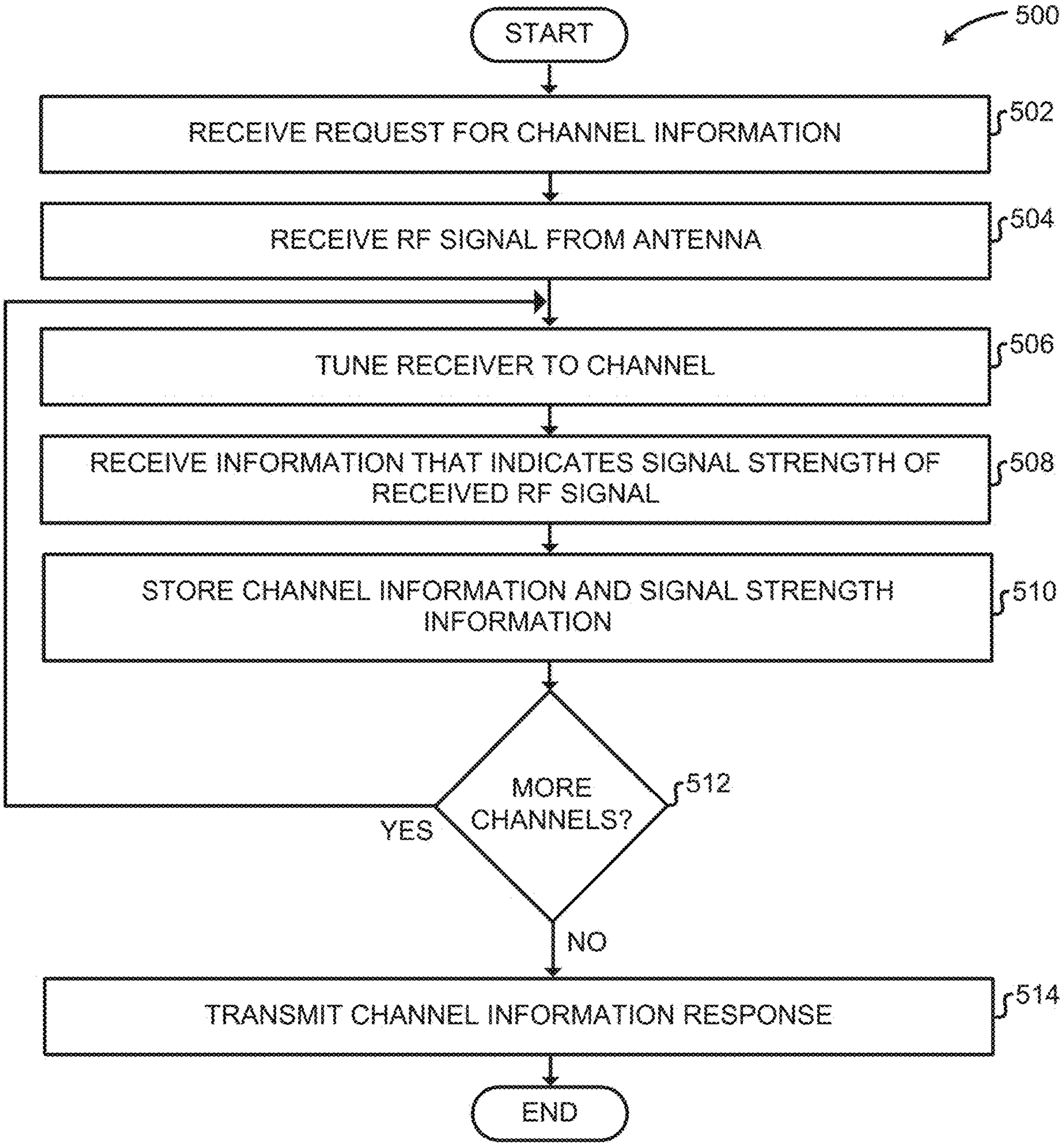
FIG. 8 shows a flowchart of a method performed by a broadcast content reception device according to one or more embodiments of the present disclosure.

FIG. 8 shows a flowchart of a method 500 performed by a broadcast content reception device (e.g., broadcast content reception devices 104A-104C) according to one or more embodiments of the present disclosure. The method 500 begins at 502.

At 502, the broadcast content reception device receives a request for channel information from the community server device 102 (e.g., that is transmitted at 304 of the method 300 shown in FIG. 6). For example, at 502, the broadcast content reception device 104A receives via the WAN 108 a request message from the community server device 102 that includes the IP address of the community server device 102 and the community identifier of the new community created by the user of the broadcast content reception device 104A. The method 500 then proceeds to 504.

At 504, the broadcast content reception device receives an RF signal from an antenna. For example, at 504, the broadcast content reception device 104A receives an HDTV signal from the antenna 138. The method 500 then proceeds to 506.

At 506, the broadcast content reception device tunes its receiver to a channel. For example, at 506, the microprocessor 122 of the broadcast content reception device 104A provides a control signal to the receiver 132 that causes a local oscillator of a tuner included in the receiver 132 to output a specified frequency such that a signal corresponding to a particular band included in the signal that transmits the channel content received at 504 is output to demodulator circuitry included in the receiver 132 and to signal strength detection circuity included in the receiver 132. The method 500 then proceeds to 508.

At 508, the broadcast content reception device receives information that indicates a signal strength corresponding to the received RF signal. For example, at 508, the microprocessor 122 of the broadcast content reception device 104A receives from the signal strength detection circuity of the receiver 132 information that indicates a signal strength corresponding to an HDTV signal received from the antenna 138. The method 500 then proceeds to 510.

At 510, the broadcast content reception device stores channel information and signal strength information. For example, at 510, the broadcast content reception device 104A stores in the memory 128 the channel identifier included in a list of channels in association with signal strength information that is based on the signal strength indication received at 508. By way of example, and not limitation, the list of channels may be included in the request for channel information received at 502, which may be obtained by the community server device 102 based on the zip code of the broadcast content reception device 104A included in community information. For example, the community server device 102 may obtain channel information included in the list of channels from a database or website that is searchable by zip code for such channel information (e.g., https://www.fcc.gov/media/engineering/dtvmaps). The method 500 then proceeds to 512.

At 512, the broadcast content reception device determines whether there are more channels. For example, at 512, the broadcast content reception device 104A determines whether more channels are included in a list of channels generated by the community server device 102 and included in the request for channel information received at 502. If the broadcast content reception device 104A determines "YES" there are more channels, the method 500 returns to 506 and the receiver is tuned to another channel included the list. If the broadcast content reception device 104A determines "NO" there are not more channels, the method 500 proceeds to 514.

At 514, the broadcast content reception device transmits a channel information response. For example, the broadcast content reception device 104A transmits to the community server device 102 via the WAN 108 a response message that includes the channel information and the signal strength information stored at 510. The method 500 then ends.

Figure 9:
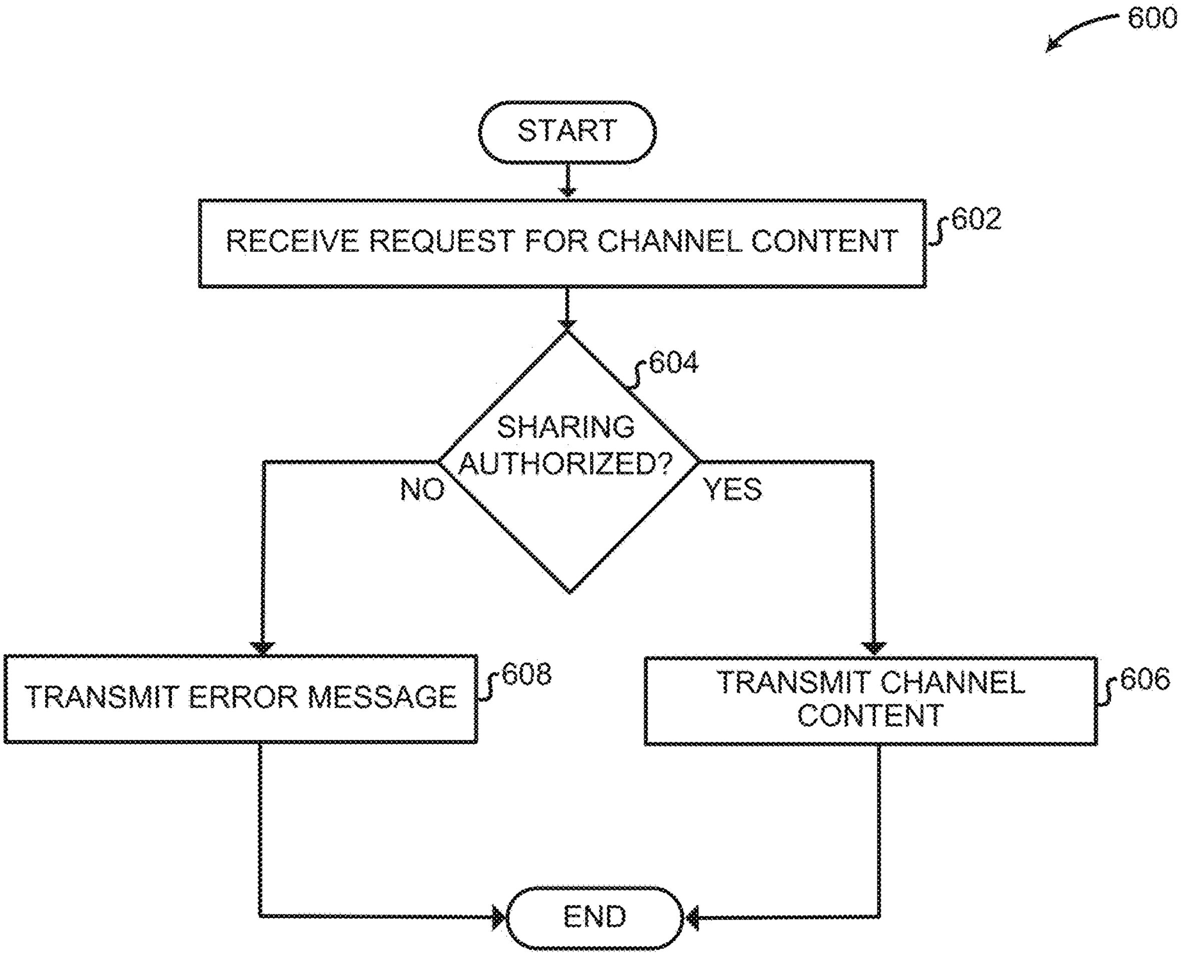
FIG. 9 shows a flowchart of a method performed by a broadcast content reception device according to one or more embodiments of the present disclosure.
Figure 10A:
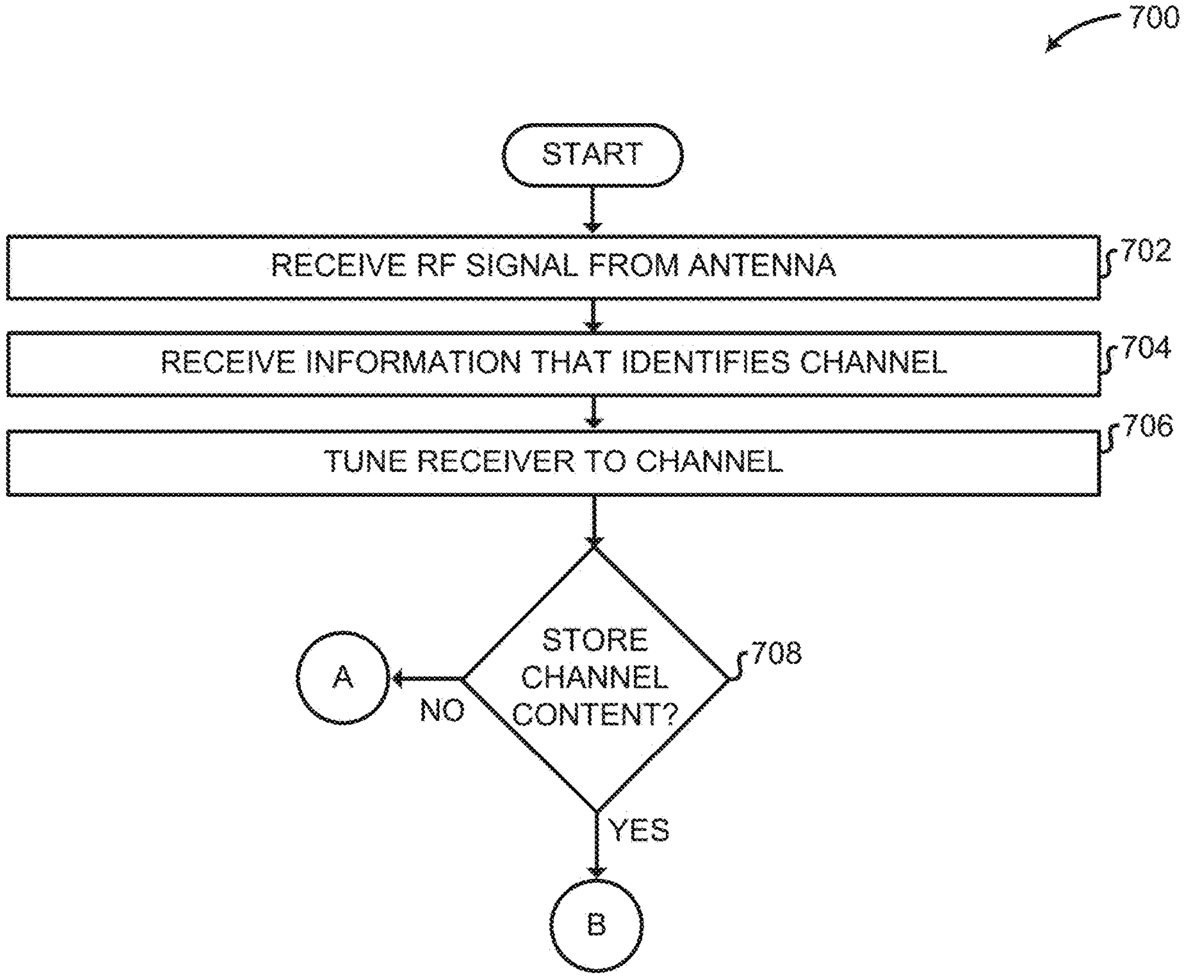
FIGS. 10A, 10B, 10C, 10D, and 10E show portions of a flowchart of a method performed by a broadcast content reception device according to one or more embodiments of the present disclosure.
Figure 10B:
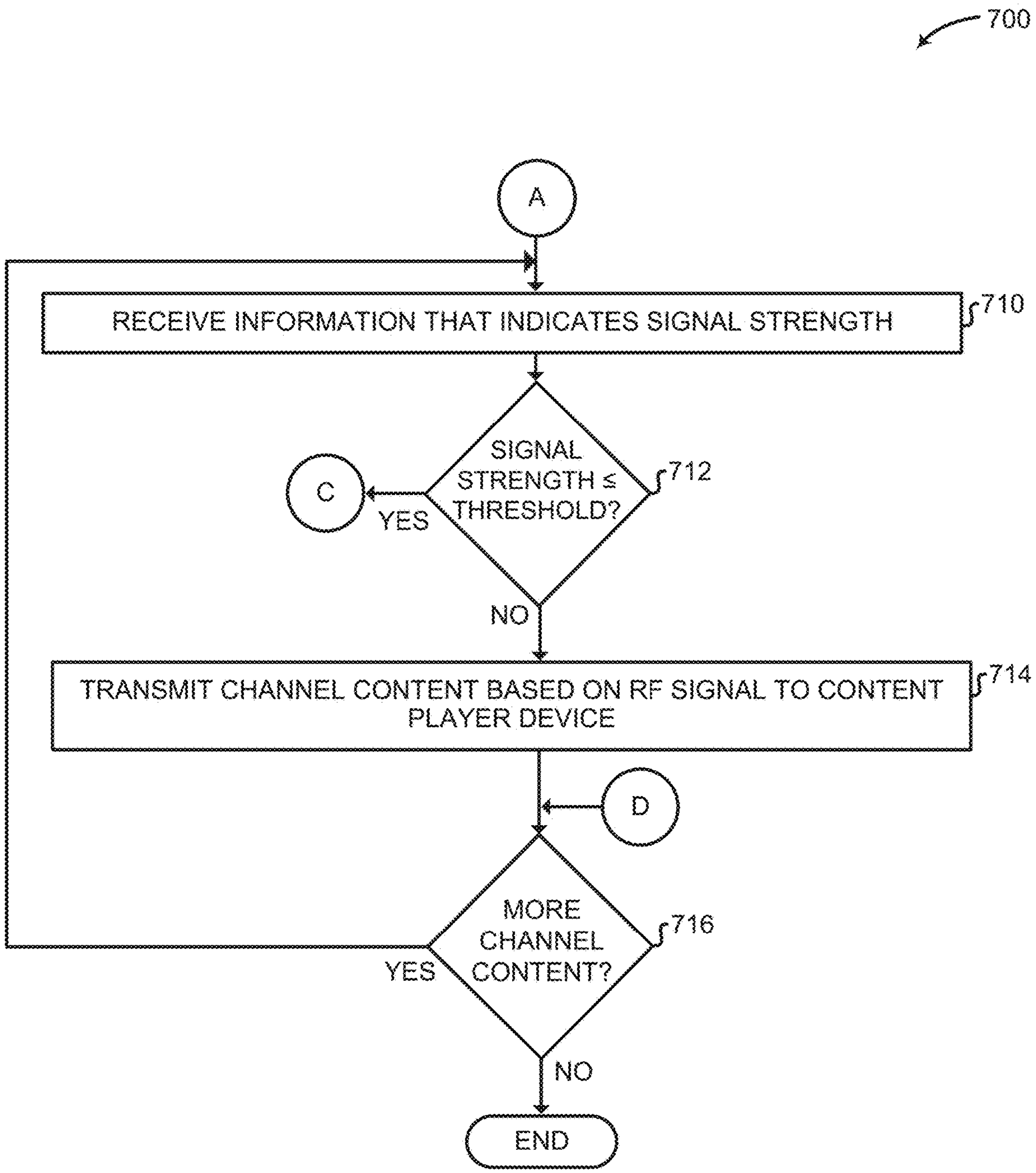
Figure 10C:
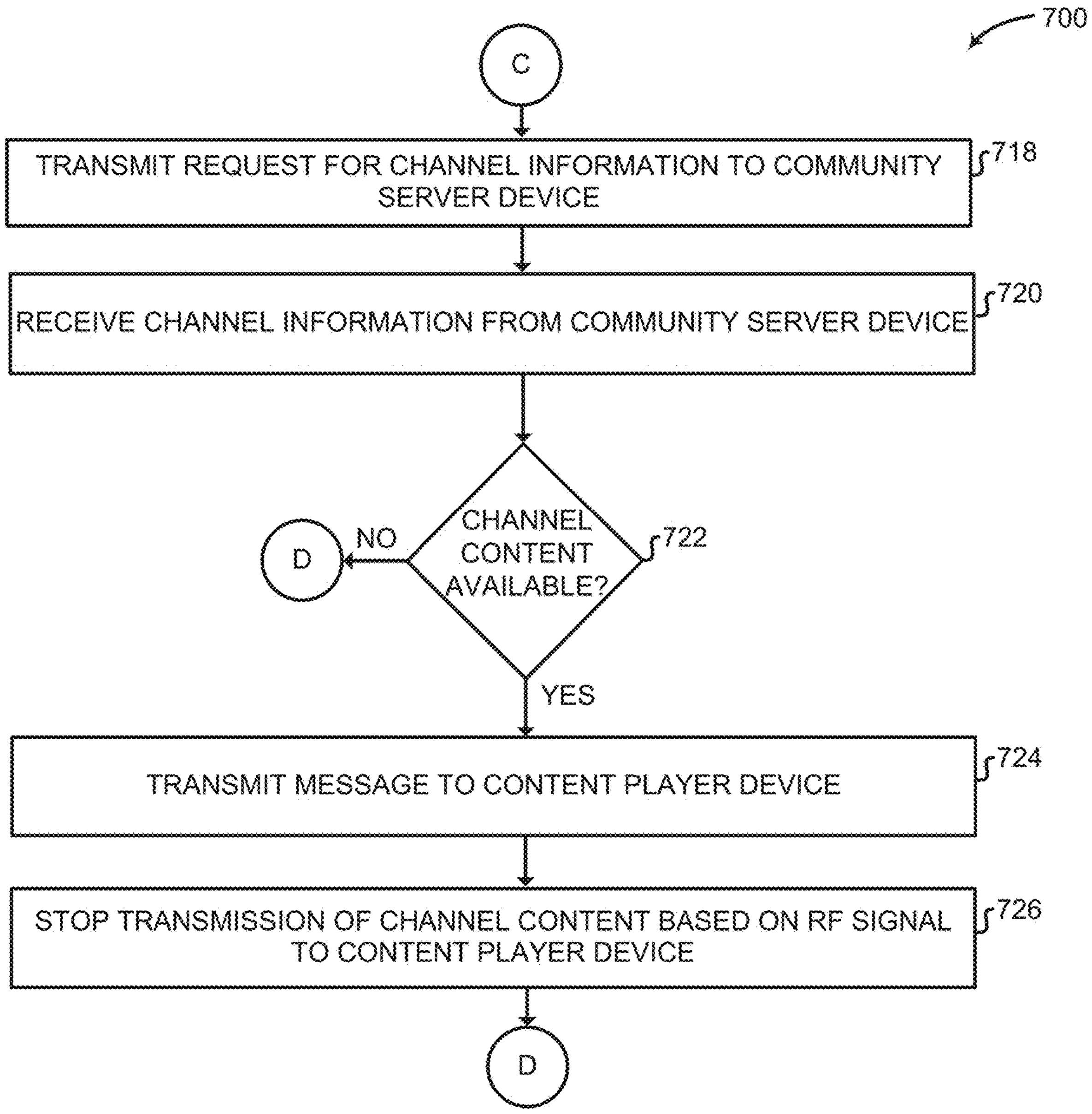
Figure 10D:
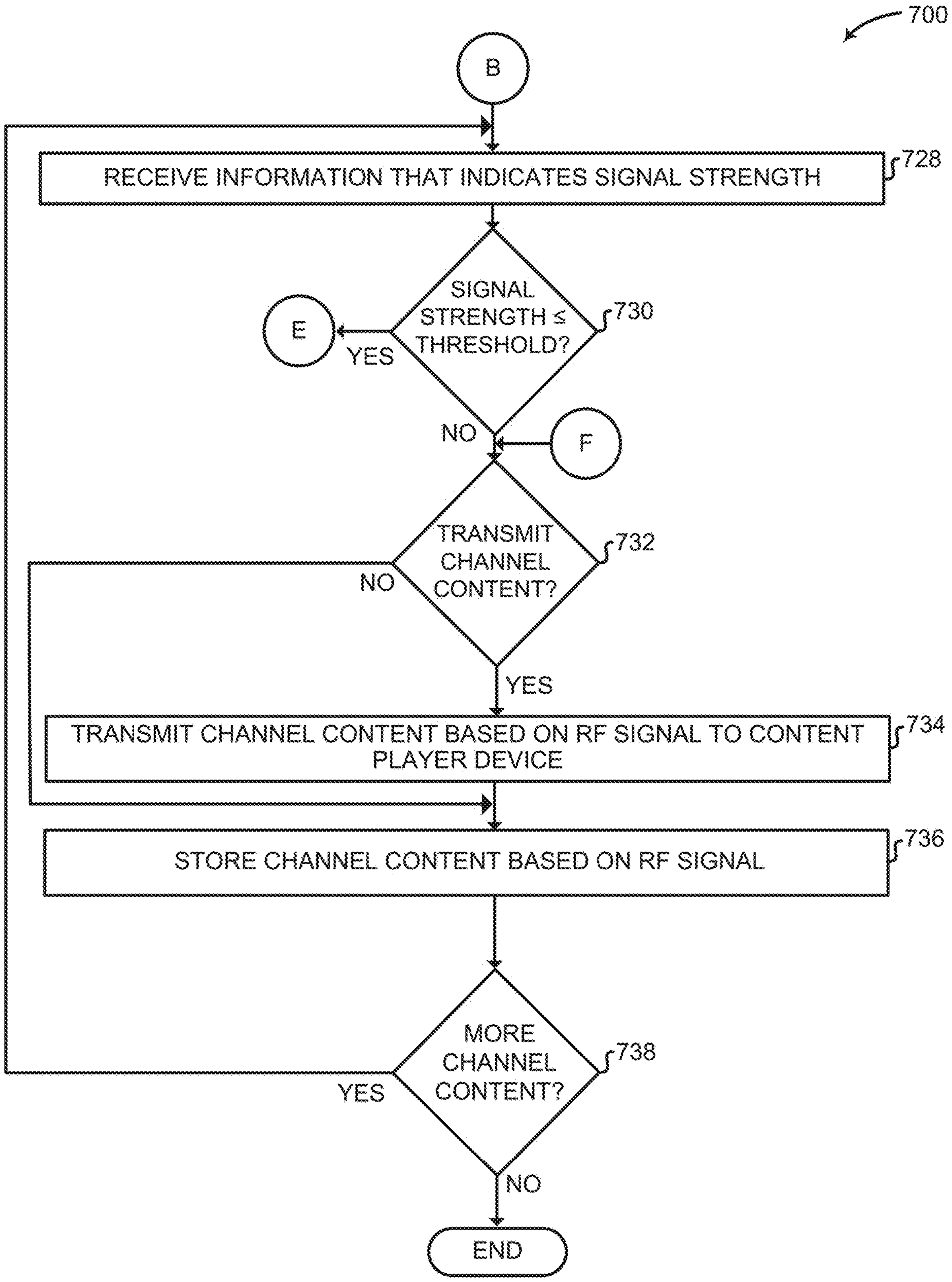
Figure 10E:
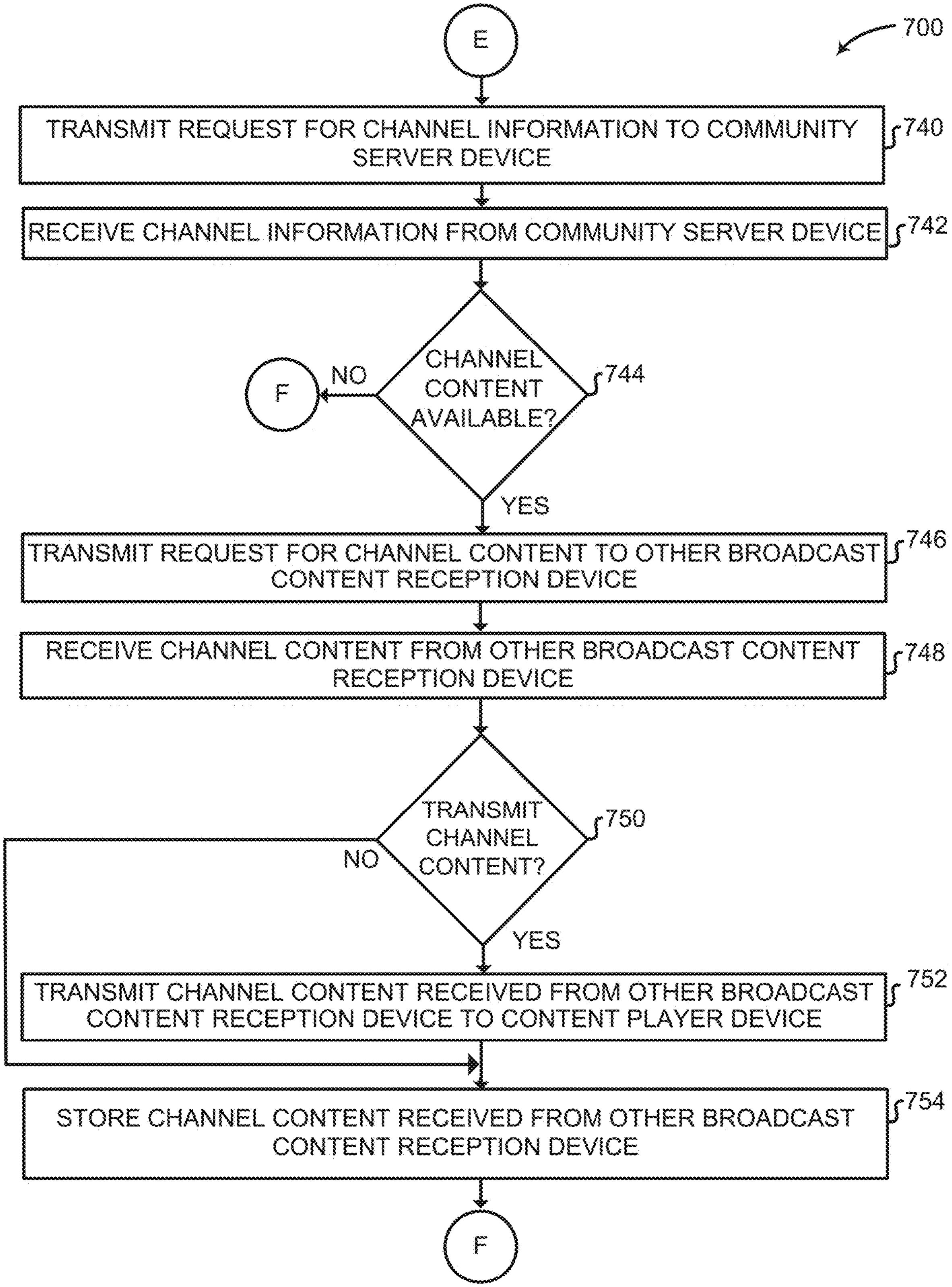

FIG. 9 shows a flowchart of a method 600 performed by a broadcast content reception device (e.g., broadcast content reception devices 104A-104C) according to one or more embodiments of the present disclosure. The method 600 begins at 602.

At 602, the broadcast content reception device receives a request for channel content. For example, at 602, the broadcast content reception device 104A receives from the broadcast content reception device 104B via the WAN 108 a request message that includes a community identifier and an identifier of a content item (e.g., name, unique alphanumeric identifier, channel identifier, etc.). In one or more implementations, the information transmitted by the community server device 102 at 410 of the method 400 shown in FIG. 7 includes authentication information (e.g., password), which the broadcast content reception device includes in the request for the content item that is received at 602. The method 600 then proceeds to 604.

At 604, the broadcast content reception device determines if it authorized to share the channel content identified in the request for content item received at 602. If the broadcast content reception device determines "YES" it is authorized to share the channel content, the method 600 proceeds to 606. If the broadcast content reception device 104A determines "NO" it is not authorized to share the channel content, the method 600 proceeds to 608.

In one or more implementations, the broadcast content reception device determines if a password included in the request for channel content that is received at 602 matches a stored password, which was previously received from or provided to the community server device 102, wherein the broadcast content reception device 104A determines that is authorized to share the channel content only if the password included in the request for the content item that is received at 602 matches the stored password.

In one or more implementations, the broadcast content reception device 104A determines whether stored community information that is associated with the community identifier included in the request for channel content includes an identifier (e.g., IP address) of the broadcast content reception device 104B that transmitted the request for content item. The broadcast content reception device 104A determines that it is authorized to share the channel content with the broadcast content reception device 104A only if the broadcast content reception device 104A determines that the identifier of the broadcast content reception device 104B that transmitted the request for channel content is included in the stored community information that is associated with the community identifier included in the request for content item.

At 606, the broadcast content reception device transmits the channel content identified in the request for content item received at 602. For example, at 606, the broadcast content reception device 104A streams channel content to the broadcast content reception device 104B via the WAN 108 using the Hypertext Transfer Protocol (HTTP) live streaming (HLS) protocol or the Dynamic Adaptive Streaming over HTTP (DASH) protocol. The method 600 then ends.

At 608, the broadcast content reception device transmits an error message to the broadcast content reception device that transmitted the request for content item received at 602. For example, at 608, the broadcast content reception device 104A transmits an error message including an error code indicating that the broadcast content reception device 104A is not authorized to share the channel content with the broadcast content reception device 104B. The method 600 then ends.

FIGS. 10A, 10B, 10C, 10D, and 10E show portions of a flowchart of a method 700 performed by a broadcast content reception device according to one or more embodiments of the present disclosure. The method 700 begins at 702.

At 702, the broadcast content reception device receives an RF signal from an antenna. For example, at 702, the broadcast content reception device 104A receives an HDTV signal from the antenna 138. The method 700 then proceeds to 704.

At 704, the broadcast content reception device receives information that identifies a channel. For example, at 702, the broadcast content reception device 104A receives from the content player device 106A (e.g., cellphone) a message that includes information that identifies a channel (e.g., a station callsign such as "KOMO-TV", a network identifier such as "ABC", a channel number such as "4", etc.), in response to a user selecting an icon corresponding to a particular television show that the user would like to watch and/or store. The method 700 then proceeds to 706.

At 706, the broadcast content reception device tunes its receiver to a channel. For example, at 706, the microprocessor 122 of the broadcast content reception device 104A provides a control signal to the receiver 132 that causes a local oscillator of a tuner included in the receiver 132 to output a specified frequency such that a signal corresponding to a particular band included in the signal that transmits the channel content received at 704 is output to demodulator circuitry included in the receiver 132 and to signal strength detection circuity included in the receiver 132. The method 700 then proceeds to 708.

At 708, the broadcast content reception device determines whether channel content is to be stored by the broadcast content reception device. If the broadcast content reception device determines that the channel content is to be stored by the broadcast content reception device at 708, the method 700 then proceeds to 728. If the broadcast content reception device determines that the channel content is not to be stored by the broadcast content reception device at 708, the method 700 then proceeds to 710.

For example, at 708, the microprocessor 110 of the broadcast content reception device 104A receives from the signal strength detection circuity of the receiver 132 information that determines whether the information that identifies the channel received at 704 is accompanied by a predefined code (e.g., "00") indicating that the channel content is to be transmitted to the content player device 106A without storing the channel content, a predefined code (e.g., "01") indicating that the channel content is to be stored without transmitting the channel content, or a predefined code (e.g., "11") indicating that the channel content is to be stored and transmitted to the content player device 106A. If the broadcast content reception device 104A determines that the information that identifies the channel received at 704 is accompanied by the predefined code (e.g., "00") indicating that the channel content is to be transmitted to the content player device 106A without storing the channel content, the broadcast content reception device 104A determines "NO" at 708. If the broadcast content reception device 104A determines that the information that identifies the channel received at 704 is accompanied by the predefined code (e.g., "01") indicating that the channel content is to be stored without transmitting the channel content or the predefined code (e.g., "11") indicating that the channel content is to be stored and transmitted to the content player device 106A, the broadcast content reception device 104A determines "YES" at 708.

At 710, the broadcast content reception device receives information that indicates a signal strength. For example, at 710, the microprocessor 110 of the broadcast content reception device 104A receives from the signal strength detection circuity of the receiver 132 information that indicates the signal strength of a signal input to the signal strength detection circuity. The method 700 then proceeds to 712.

At 712, the broadcast content reception device determines if the information that indicates the signal strength received at 710 indicates a signal strength value that is less than or equal to a threshold value. For example, at 712, the microprocessor 122 of the broadcast content reception device 104A determines if the information that indicates the signal strength received at 710 indicates a signal strength value that is less than or equal to −81 dBm. If the broadcast content reception device determines "YES" the information that indicates the signal strength received at 710 indicates a signal strength value that is less than or equal to the threshold value, the method 700 proceeds to 718. If the broadcast content reception device 104A determines "NO" the information that indicates the signal strength received at 710 does not indicate a signal strength value that is less than or equal to the threshold value, the method 700 proceeds to 714.

At 714, the broadcast content reception device transmits channel content based on the RF signal received at 702 to a content player device. For example, at 714, the microprocessor 122 of the broadcast content reception device 104A streams the content item based on the RF signal received at 702 to the content player device 106A using the HLS protocol or the DASH protocol. The method 700 then proceeds to 716.

At 716, the broadcast content reception device determines whether there is more channel content to be transmitted to the content player device. For example, at 714, the broadcast content reception device 104A determines whether all of a content item corresponding to the channel content has been streamed to the content player device by comparing a file size of the content item to an amount of data transmitted to the content player device. If the broadcast content reception device determines "NO" there is not more channel content to be transmitted to the content player device, the method 700 ends. If the broadcast content reception device determines "YES" there is more channel content to be transmitted to the content player device, the method returns to 710 and information is received that indicates a signal strength corresponding to the signal received from the antenna.

At 718, the broadcast content reception device transmits a request for channel information to a community server device. For example, at 718, the broadcast content reception device 104A transmits to the community server device 102 a request for channel information that includes the information that identifies the channel received at 704. The method 700 then proceeds to 720.

At 720, the broadcast content reception device receives channel information from the community server device 102. For example, at 720, the broadcast content reception device 104A receives from the community server device 102 channel information including an IP address of the broadcast content reception device 104B (e.g., transmitted at 410 of the method 400 shown in FIG. 7) that is capable of receiving the channel identified by the information that identifies the channel received at 704. The method 700 then proceeds to 722.

At 722, the broadcast content reception device determines if the channel information received at 720 indicates that content corresponding to the channel identified by the information that identifies the channel received at 704 is available from another broadcast content reception device in the community. If the broadcast content reception device determine "NO" the channel information received at 720 indicates that content is not available from another broadcast content reception device in the community, the method 700 returns to 716 and the broadcast content reception device determines whether there is more channel content to be transmitted to the content player device. If the broadcast content reception device determines "YES" the channel information received at 720 indicates that content is available from another broadcast content reception device in the community, the method 700 proceeds to 724.

For example, at 722, the broadcast content reception device 104A determines if the channel information received at 720 includes a predefined error code (e.g., "0000"), which indicates that channel content corresponding to the channel identified by the information that identifies the channel received at 704 is not available from another broadcast content reception device. If the broadcast content reception device 104A determines that the error code is included in the channel information received at 720, the broadcast content reception device 104A determines that the content is not available from another broadcast content reception device. If the broadcast content reception device 104A determines that error code is not included in the channel information received at 720, the broadcast content reception device 104A determines that the content is available from another broadcast content reception device.

In one or more embodiments, the method 700 does not include the acts described above in connection with 718, 720, and 722. Instead, if the broadcast content reception device determines "YES" at 712, the method 700 proceeds to 724, for example, as described in connection with FIG. 12B.

At 724, the broadcast content reception device transmits a message to a content player device. For example, at 724, the microprocessor 122 of the broadcast content reception device 104A transmits an error message that includes a predefined error code (e.g., "1111") to the content player device 106A. In one or more implementations, the message transmitted at 724 to the content player device includes information that identifies the community server device 102 (e.g., IP address of the community server device 102), information that identifies a particular community of broadcast content reception device, and the information that identifies the channel received at 704. The method 700 proceeds to 724.

As described in connection with FIG. 12B, in response to receiving the message transmitted at 724, the content player device 106A transmits a request for channel information including the channel information that identifies the channel received at 702 from the content player device 106A. The community server device 102 receives the request for channel information at 402 of the method 400. For example, at 410, the community server device 102 transmits information that identifies the channel and information that identifies the broadcast content reception device 104B to the content player device 106A. Upon receipt of the channel information transmitted at 410 of the method 400, the content player device 106A requests streaming of the content item from the broadcast content reception device 104B.

At 726, the broadcast content reception device stops transmission of the content item transmitted at 712, if the content item is transmitted at 714. For example, at 726, the microprocessor 122 of the broadcast content reception device 104A stops streaming the content item based on the RF signal received at 702 to the content player device 106A. The method 700 then returns to 716 and the broadcast content reception device determines whether there is more channel content to be transmitted to the content player device.

At 728, the broadcast content reception device receives information that indicates a signal strength. For example, at 728, the microprocessor 122 of the broadcast content reception device 104A receives from the signal strength detection circuity of the receiver 132 information that indicates the signal strength of a signal input to the signal strength detection circuity. The method 700 then proceeds to 730.

At 730, the broadcast content reception device determines if the information that indicates the signal strength received at 728 indicates a signal strength value that is less than or equal to a threshold value. For example, at 710, the microprocessor 122 of the broadcast content reception device 104A determines if the information that indicates the signal strength received at 728 indicates a signal strength value that is less than or equal to −81 dBm. If the broadcast content reception device determines "YES" the information that indicates the signal strength received at 728 indicates a signal strength value that is less than or equal to the threshold value, the method 700 proceeds to 740. If the broadcast content reception device 104A determines "NO" the information that indicates the signal strength received at 728 does not indicate a signal strength value that is less than or equal to the threshold value, the method 700 proceeds to 732.

At 732, the broadcast content reception device determines whether channel content is to be transmitted to the content player device. If the broadcast content reception device determines that the channel content is to be transmitted to the content player device at 732, the method 700 then proceeds to 734. If the broadcast content reception device determines that the channel content is not to be transmitted to the content player device at 732, the method 700 then proceeds to 736.

For example, if the broadcast content reception device 104A determines that the information that identifies the channel received at 704 is accompanied by the predefined code (e.g., "00") indicating that the channel content is to be transmitted to the content player device 106A without storing the channel content or the predefined code (e.g., "11") indicating that the channel content is to be stored and transmitted to the content player device 106A, the broadcast content reception device 104A determines "YES" at 732. If the broadcast content reception device 104A determines that the information that identifies the channel received at 704 is accompanied by the predefined code (e.g., "01") indicating that the channel content is to be stored without transmitting the channel content, the broadcast content reception device 104A determines "NO" at 732.

At 734, the broadcast content reception device transmits channel content based on the RF signal received at 702 to a content player device. For example, at 734, the microprocessor 122 of the broadcast content reception device 104A streams the channel content based on the RF signal received at 702 to the content player device 106A using the HLS protocol or the DASH protocol. The method 700 then proceeds to 736.

At 736, the broadcast content reception device stores the channel content based on the RF signal received at 702. For example, at 736, the microprocessor 122 of the broadcast content reception device 104A causes the broadcast content reception device 104A to operate as a DVR that stores the channel content in the memory 128 or an external hard drive coupled to the broadcast content reception device 104A via the I/O circuitry 130 of the broadcast content reception device 104A. The method 700 then proceeds to 738.

At 738, the broadcast content reception device determines whether there is more channel content to be stored by the broadcast content reception device. For example, at 738, the broadcast content reception device 104A determines whether all of a content item corresponding to the channel content has been stored by the broadcast content reception device by comparing a file size of the content item to an amount of data stored by the broadcast content reception device. If the broadcast content reception device determines "NO" there is not more channel content to be transmitted to the content player device, the method 700 ends. If the broadcast content reception device determines "YES" there is more channel content to be stored by the broadcast content reception device, the method returns to 728 and information is received that indicates the signal strength corresponding to the signal received from the antenna.

At 740, the broadcast content reception device transmits a request for channel information to the community server device 102. For example, at 740, the broadcast content reception device 104A transmits to the community server device 102 a request for channel information that includes the information that identifies the channel received at 704 and information the identifies a particular community of broadcast content reception devices. The method 700 then proceeds to 742.

At 742, the broadcast content reception device receives channel information from a community server device. For example, at 742, the broadcast content reception device 104A receives from the community server device 102 channel information including an IP address of the broadcast content reception device 104B (e.g., transmitted at 410 of the method 400 shown in FIG. 7) that is capable of receiving the channel identified by the information that identifies the channel received at 704. The method 700 then proceeds to 744.

At 744, the broadcast content reception device determines if the channel information received at 742 indicates that content corresponding to the channel identified by the information that identifies the channel received at 704 is available from another broadcast content reception device in the community. If the broadcast content reception device determines "NO" the channel information received at 742 indicates that content is not available from another broadcast content reception device in the community, the method 700 returns to 732 and the broadcast content reception device determines whether channel content is to be transmitted to the content player device. If the broadcast content reception device determines "YES" the channel information received at 742 indicates that content is available from another broadcast content reception device in the community, the method 700 proceeds to 746.

At 746, the broadcast content reception device transmits a request for a channel content to another broadcast content reception device. For example, at 746, the broadcast content reception device 104A transmits a request for a channel content including the information that identifies the channel received at 704 to the broadcast content reception device 104B, using the IP address of the broadcast content reception device 104B included in the channel information received at 742 (e.g., transmitted at 410 of the method 400 shown in FIG. 7). The method 700 then proceeds to 748.

At 748, the broadcast content reception device receives the channel content from the other broadcast content reception device. For example, at 748, the broadcast content reception device 104A receives the channel content from the broadcast content reception device 104B using the file transfer protocol (FTP), the HLS protocol, or the DASH protocol. The method 700 then proceeds to 750.

At 750, the broadcast content reception device determines whether channel content is to be transmitted to the content player device. If the broadcast content reception device determines "YES" the channel content is to be transmitted to the content player device at 750, the method 700 then proceeds to 752. If the broadcast content reception device determines "NO" the channel content is not to be transmitted to the content player device at 750, the method 700 then proceeds to 754.

At 752, the broadcast content reception device transmits the channel content received from the other broadcast content reception device at 748 to a content player device. For example, at 752, the microprocessor 122 of the broadcast content reception device 104A streams the channel content received from the broadcast content reception device 104B at 748 to the content player device 106A using the HLS protocol or the DASH protocol. The method 700 then proceeds to 754.

At 754, the broadcast content reception device stores the channel content received from the other broadcast content reception device at 748. For example, at 748, the broadcast content reception device 104A stores the channel content received from the other broadcast content reception device at 748 in the memory 128 or an external hard drive coupled to the broadcast content reception device 104A via the I/O circuitry 130 of the broadcast content reception device 104A. The method 700 then returns to 732 and the broadcast content reception device determines whether channel content is to be transmitted to the content player device.

Figure 11:
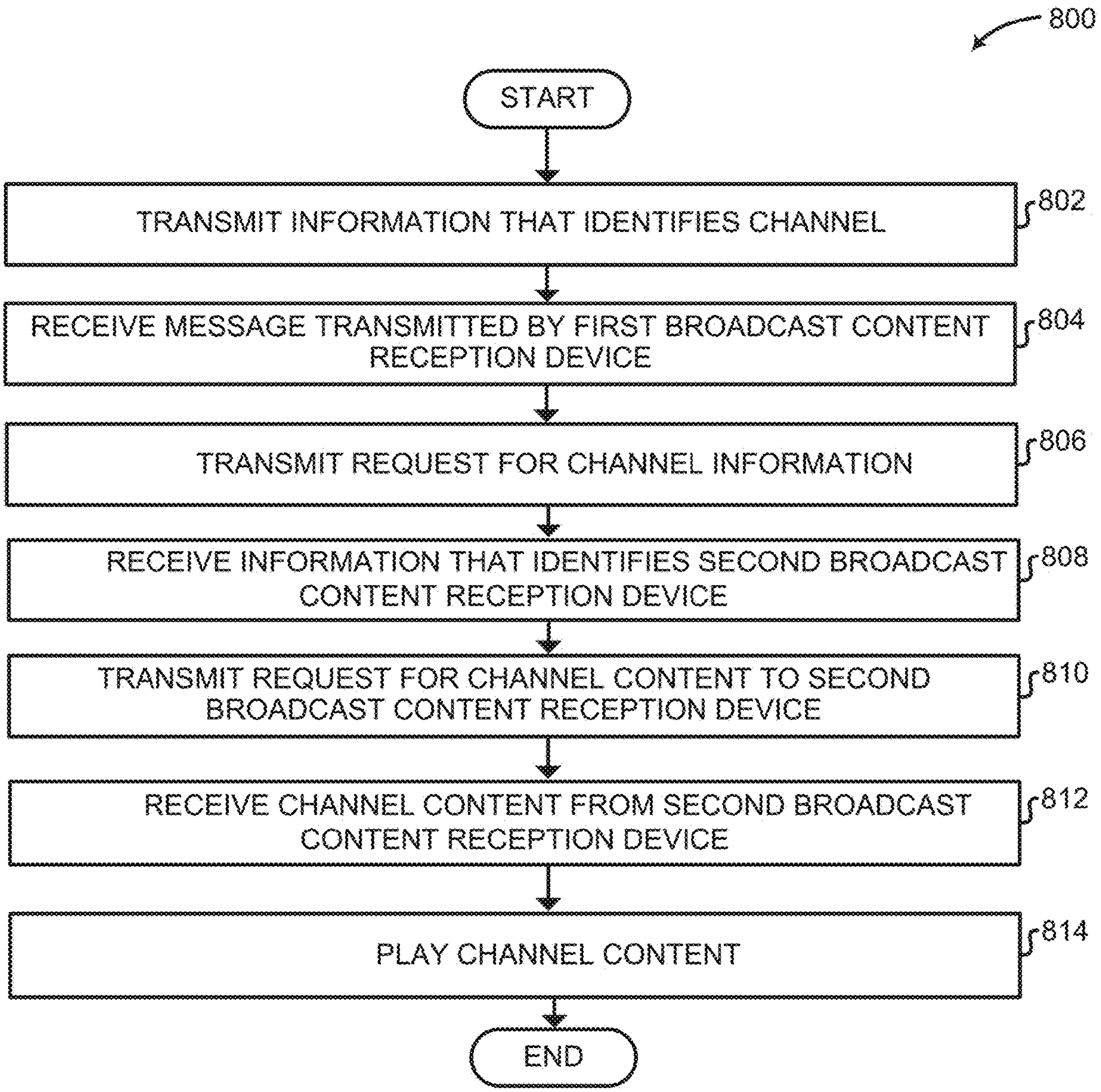
FIG. 11 shows a flowchart of a method performed by a content player device according to one or more embodiments of the present disclosure.

FIG. 11 shows a flowchart of a method 800 performed by the content player device 106 according to one or more embodiments of the present disclosure. The method 800 begins at 802.

At 802, a content player device transmits information that identifies a channel. For example, the content player device 106A transmits information that identifies a channel (e.g., channel number) via the WAN 108, which is accompanied by a predefined code (e.g., "00") indicating that the channel content is to be transmitted to the content player device 106A without storing the channel content, a predefined code (e.g., "01") indicating that the channel content is to be stored without transmitting the channel content or a predefined code (e.g., "11") indicating that the channel content is to be stored and transmitted to the content player device 106A. The method 800 then proceeds to 804.

At 804, the content player device receives a message transmitted by a first broadcast content reception device. For example, at 804, the content player device 106A receives a message via the WAN 108 transmitted by the broadcast content reception device 104A, which includes information that identifies a particular channel and information that identifies a particular community of broadcast content reception devices. The method 800 then proceeds to 806.

At 806, the content player device transmits a request for channel information. For example, at 806, the content player device 106A transmits to the community server device 102 via the WAN 108 a request for channel information, which includes the information that identifies the channel and the information that identifies the community of broadcast content reception devices received at 804. The method 800 then proceeds to 808.

At 808, the content player device receives information that identifies a second broadcast content reception device. For example, the content player device 106A receives information that identifies the broadcast content reception device 104B (e.g., IP address of the broadcast content reception device 104B) from the community server device 102 via the WAN 108. The method 800 then proceeds to 810.

At 810, the content player device transmits a request for channel content to the second broadcast content reception device. For example, at 810, the content player device 106A transmits a request for channel content, which includes the information that identifies the channel received at 804, to the broadcast content reception device 104B via the WAN 108. The method 800 then proceeds to 812.

At 812, the content player device receives the channel content from the second broadcast content reception device. For example, at 810, the content player device 106A receives the channel content from the broadcast content reception device 104B via the WAN 108. The method 800 then proceeds to 814.

At 812, the content player device plays the channel content. For example, at 810, the microprocessor 140 of the content player device 106A causes the display device 150 to display the channel content received from the broadcast content reception device 104B, and also causes a speaker to emit sounds corresponding to the channel content. The method 800 then ends.

Figure 12A:
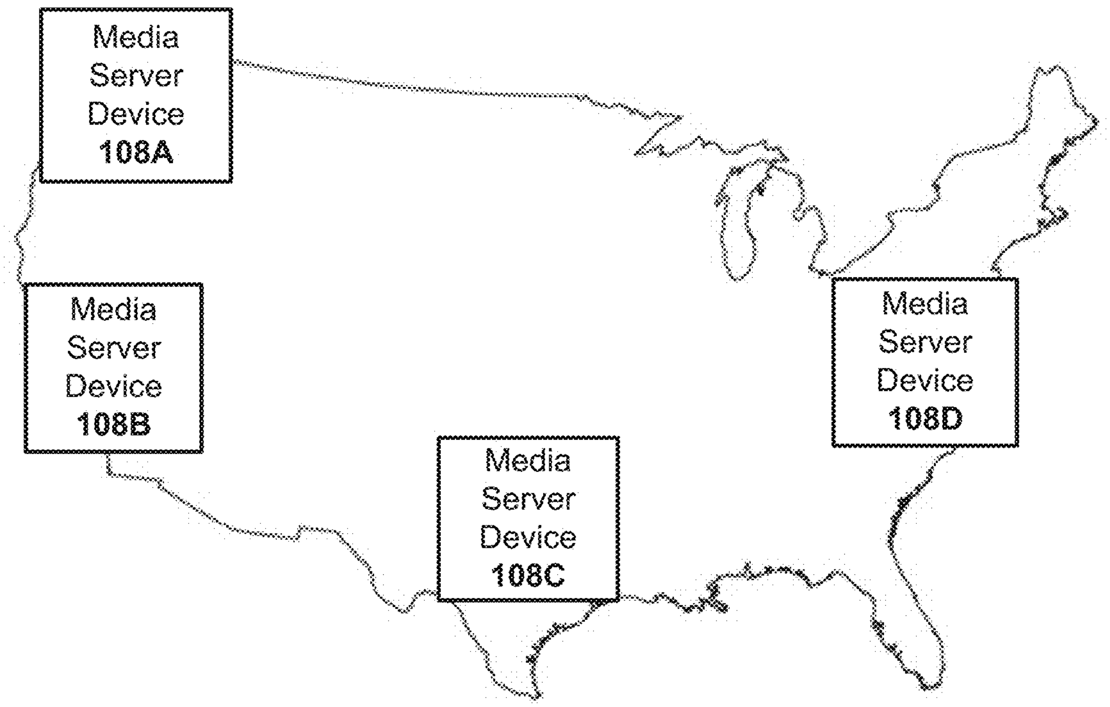
FIGS. 12A and 12B are diagrams for explaining examples of using an OTA broadcast content reception and distribution system according to one or more embodiments of the present disclosure.
Figure 12B:
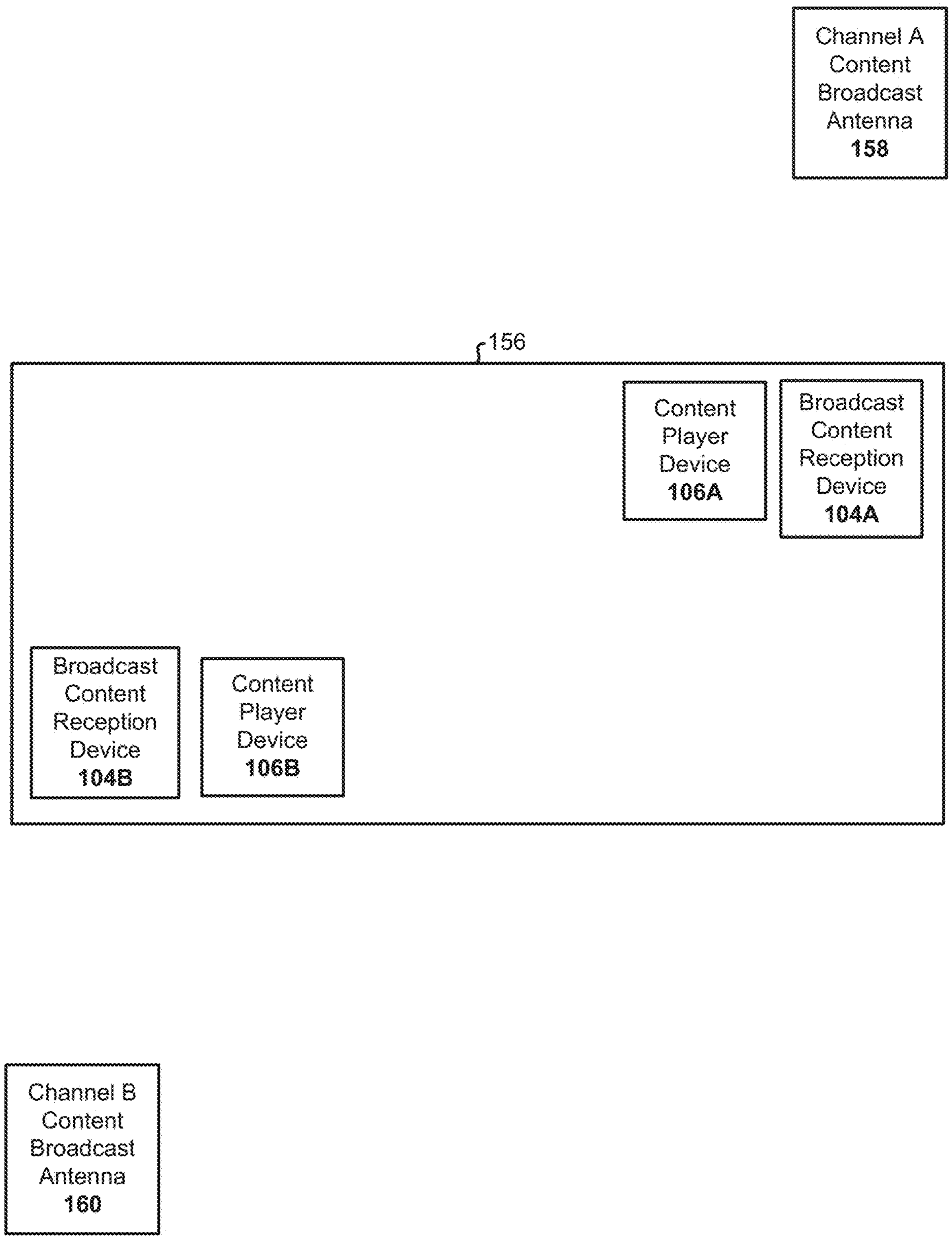

FIGS. 12A and 12B are diagrams for explaining examples of using an OTA broadcast content reception and distribution system according to one or more embodiments of the present disclosure.

In the example of FIG. 12A, a community of broadcast content reception devices includes the broadcast content reception devices 104A-104D, which are geographically dispersed in various parts of the United State of America. For example, the broadcast content reception device 104A is located in Seattle, Washington; the broadcast content reception devices 104B is located in San Diego, California; the broadcast content reception devices 104C is located in Austin, Texas; and the broadcast content reception devices 104D is located in Raleigh, North Carolina. Any of the broadcast content reception devices 104A-104D can provide locally received broadcast content to any other of the content reception devices 104A-104D. For example, the broadcast content reception device 104B located in San Diego can provide a local television news broadcast to the broadcast content reception device 104D located in Raleigh via the WAN 108, which is not possible using conventional HDTV OTA broadcast content reception and distribution systems.

The example of FIG. 12B is described with reference to the method 400 shown in FIG. 7, the method 600 shown in FIG. 9, and the method 700 shown in FIGS. 10A-10E. In the example of FIG. 12B, a community of broadcast content reception devices includes the broadcast content reception devices 104A and 104B, which are located at opposite ends of a very large apartment building 156 that is located in an urban environment that causes a great deal of multipath interference. An antenna 158 that broadcasts a signal used to transmit Channel A content is located relative to the apartment building 156 such that the signal used to broadcast the Channel A content is received with a relatively high signal strength by an antenna (not shown in FIG. 12B) coupled to the broadcast content reception device 104A; however, the signal used to broadcast the Channel A content is not received with a relatively high signal strength by an antenna (not shown in FIG. 12B) coupled to the broadcast content reception device 104B. An antenna 160 that broadcasts a signal used to transmit Channel B content is located relative to the apartment building 156 such that the signal used to broadcast the Channel B content is received with a relatively high signal strength by the antenna coupled to the broadcast content reception device 104B; however, the signal used to broadcast the Channel B content is not received with a relatively high signal strength by the antenna coupled to the broadcast content reception device 104A. Accordingly, the broadcast content reception device 104A is able to receive the Channel A content, but is not able to receive the Channel B content. Similarly, the broadcast content reception device 104B is able to receive the Channel B content, but is not able to receive the Channel A content Referring to the method 700 shown in FIGS. 10A-10E, the broadcast content reception device 104A receives at 704 of the method 700 information that identifies Channel B to the broadcast content reception device 104A, which is transmitted by the content player device 106A in response to a user using an application executing on the content player device 106A to request that the broadcast content reception device 104A provide Channel B content to the content player device 106A. The broadcast content reception device 104A then tunes the receiver 132 of the broadcast content reception device 104A to Channel B at 706 of the method 700.

Assuming that the information that identifies Channel B received by the broadcast content reception device 104A at 704 of the method 700 is accompanied by the predefined code (e.g., "00") indicating that the channel content is to be transmitted to the content player device 106A without storing the channel content, the broadcast content reception device 104A determines "NO" at 708 and the method 700 proceeds to 710. At 710, the broadcast content reception device 104A receives information that indicates a signal strength corresponding to the signal used to broadcast the Channel B content, wherein the signal strength is below a threshold value. Thus, the broadcast content reception device 104A determines "YES" the signal strength of the signal used to broadcast the Channel B is below the threshold value at 712 of the method 700.

In the example of FIG. 12B, 718, 720, and 722 of the method 700 are not performed. Instead, after the broadcast content reception device 104A determines "YES" at 712 of the method 700, the method 700 proceeds to 724. At 724, broadcast content reception device 104A automatically transmits to the content player device 106A a message that includes the predefined error code (e.g., "1111"), the information that identifies Channel B (e.g., channel number), information that identifies the broadcast content reception device 104A (e.g., IP address of the broadcast content reception device 104A), information that identifies the community server device 102 (e.g., IP address of the community server device 102), and information that identifies a community to which the broadcast content reception device 104A belongs (e.g., community number).

Referring now to the method 800 shown in FIG. 11. In response, the content player device 106A transmits a request for channel information to the community server device 102 at 806. For example, the content player device 106A uses the information that identifies the community server device 102 (e.g., IP address of the community server device 102) to transmit to the community server device 102 a request for channel information that includes the information that identifies Channel B (e.g., channel number), information that identifies the broadcast content reception device 104A (e.g., IP address of the broadcast content reception device 104A), and information that identifies a community to which the broadcast content reception device 104A belongs (e.g., community number).

Referring now to the method 400 shown in FIG. 7, the community server device 102 receives the request for channel information transmitted by the content player device 106A at 402 of the method 400. The community server device 102 transmits a request for channel information including the information that identifies Channel B to the broadcast content reception device 104B at 404 of the method 400. The community server device 102 receives channel information indicating that the signal used to broadcast the Channel B content is received at a relatively high signal strength by the broadcast content reception device 104B at 406 of the method 400. Using the channel information received at 406, the community server device 102 selects the broadcast content reception device 104B at 408 of the method 400. The community server device 102 then transmits information that identifies Channel B and information that identifies the broadcast content reception device 104B to the content player device 106A at 410 of the method 400.

In response, the content player device 106A transmits a request for Channel B content to the broadcast content reception device 104B at 810 of the method 800 shown in FIG. 11.

Referring now to the method 600 shown in FIG. 9, at 602 of the method 600, the broadcast content reception device 104B receives the request for Channel B content from the content player device 106A. The broadcast content reception device 104B determines that it is authorized to share the Channel B content with the content player device 106A at 604 of the method 600. Accordingly, the broadcast content reception device 104B transmits the Channel B content to the content player device 106A at 606 of the method 600.

In response, the content player device 106A receives the Channel B content from the broadcast content reception device 104B at 812 of the method 800 shown in FIG. 11. At 814 of the method 800, the content player device 106A plays the Channel B content received at 812. Thus, the user of the broadcast content reception device 104A and the content player device 106A is able to view the Channel B content even though the antenna coupled to the content reception device 104A is not able to receive the signal used to broadcast the Channel B content with a good signal strength. Similarly, the user of the broadcast content reception device 104A and the content player device 106A is able to record the Channel B content even though the antenna coupled to the content reception device 104A is not able to receive the signal used to broadcast the Channel B content with a good signal strength.

The various embodiments described above can be combined to provide further embodiments. For example, although the methods shown in connection with FIGS. 5-7 have been described as being performed by the community server device 102, those methods may be performed by one or more of the broadcast content reception devices 104.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A community server device that communicates with a plurality of broadcast content reception devices, the device comprising:

a transceiver;

a processor coupled to the transceiver; and a memory storing instructions that, when executed by the processor, cause the processor to:

store community information including information that identifies each of the plurality of broadcast content reception devices and information that identifies a community of broadcast content reception devices;

receive, via the transceiver, a first request for channel information from a first one of the broadcast content reception devices included in the community of broadcast content reception devices, the first request for channel information including information that identifies a channel;

transmit, via the transceiver, a second request for channel information to one or more of the broadcast content reception devices included in the community of broadcast content reception devices other than the first one of the broadcast content reception devices using the community information in response to receiving the first request for channel information, the second request for channel information including the information that identifies the channel included in the first request for channel information;

receive, via the transceiver, information that indicates a signal strength corresponding to the channel from each of the one or more of the broadcast content reception devices included in the community of broadcast content reception devices other than the first one of the broadcast content reception devices;

select a selected one of the one or more of the broadcast content reception devices included in the community of broadcast content reception devices other than the first one of the broadcast content reception devices based on the information that indicates the signal strength corresponding to the channel received from each of the one or more of the broadcast content reception devices included in the community of broadcast content reception devices other than the first one of the broadcast content reception devices; and transmit to the first one of the broadcast content reception devices, via the transceiver, information that identifies the selected one of the one or more of the broadcast content reception devices included in the community of broadcast content reception devices other than the first one of the broadcast content reception devices.

2. The device according to claim 1, wherein:

the memory stores information that indicates a number of content items currently being provided to a network by each of the one or more of the broadcast content reception devices included in the community of broadcast content reception devices other than the first one of the broadcast content reception devices or information that indicates a data rate associated with each of the one or more of the broadcast content reception devices included in the community of broadcast content reception devices other than the first one of the broadcast content reception devices, and the instructions, when executed by the processor, cause the processor to select the selected one of the one or more of the broadcast content reception devices included in the community of broadcast content reception devices other than the first one of the broadcast content reception devices based on (i) the information that indicates the signal strength corresponding to the channel received from each of the one or more of the broadcast content reception devices included in the community of broadcast content reception devices other than the first one of the broadcast content reception devices, and (ii) the information that indicates the number of content items currently being provided to the network by each of the one or more of the broadcast content reception devices included in the community of broadcast content reception devices other than the first one of the broadcast content reception devices or the information that indicates the data rate associated with each of the one or more of the broadcast content reception devices included in the community of broadcast content reception devices other than the first one of the broadcast content reception devices.

3. The device according to claim 1, wherein the instructions, when executed by the processor, cause the processor to transmit the information that identifies the channel included in the first request for channel information with the information that identifies the selected one of the one or more of the broadcast content reception devices included in the community of broadcast content reception devices other than the first one of the broadcast content reception devices to the first one of the broadcast content reception devices.

4. The device according to claim 1, wherein:

the request for channel information includes the information that identifies the community of broadcast content reception devices, and the instructions, when executed by the processor, cause the processor to:

obtain the community information using the information that identifies the community of broadcast content reception devices;

obtain information that identifies the one or more of the broadcast content reception devices included in the community of broadcast content reception devices other than the first one of the broadcast content reception devices from the community information, and transmit the second request for channel information to the one or more of the broadcast content reception devices included in the community of broadcast content reception devices other than the first one of the broadcast content reception devices using the information that identifies the one or more of the broadcast content reception devices included in the community of broadcast content reception devices other than the first one of the broadcast content reception devices.

5. The device according to claim 1, wherein the instructions, when executed by the processor, cause the processor to:

receive, via the transceiver, a third request for channel information from a second one of the broadcast content reception devices included in the community of broadcast content reception devices;

transmit, via the transceiver, one or more fourth requests for channel information to one or more of the broadcast content reception devices included in the community of broadcast content reception devices other than the second one of the broadcast content reception devices in response to receiving the third request for channel information;

receive, via the transceiver, information that indicates one or more signal strengths corresponding to one or more channels from each of the one or more of the broadcast content reception devices included in the community of broadcast content reception devices other than the second one of the broadcast content reception devices;

generate a content list including information that identifies a plurality of content items based on the information that indicates the one or more signal strengths corresponding to the one or more channels received from each of the one or more of the broadcast content reception devices included in the community of broadcast content reception devices other than the second one of the broadcast content reception devices; and transmit, via the transceiver, the content list to the second one of the broadcast content reception devices.

6. The device according to claim 5, wherein the instructions, when executed by the processor, cause the processor to:

obtain information that identifies a plurality of genres respectively corresponding to the plurality of content items, and arrange the information that identifies the plurality of content items included in the content list based on the information that identifies the plurality of genres respectively corresponding to the plurality of content items, wherein the content items that respectively corresponding to each of the genres are grouped together in the information that identifies the plurality of content items included in the content list.

7. A method of operating a community server device, the method comprising:

storing community information including information that identifies each of the plurality of broadcast content reception devices and information that identifies a community of broadcast content reception devices;

receiving, via a transceiver, a first request for channel information from a first one of the broadcast content reception devices included in the community of broadcast content reception devices, the first request for channel information including information that identifies a channel;

transmitting, via the transceiver, a second request for channel information to one or more of the broadcast content reception devices included in the community of broadcast content reception devices other than the first one of the broadcast content reception devices using the community information in response to receiving the first request for channel information, the second request for channel information including the information that identifies the channel included in the first request for channel information;

receiving, via the transceiver, information that indicates a signal strength corresponding to the channel from each of the one or more of the broadcast content reception devices included in the community of broadcast content reception devices other than the first one of the broadcast content reception devices;

selecting a selected one of the one or more of the broadcast content reception devices included in the community of broadcast content reception devices other than the first one of the broadcast content reception devices based on the information that indicates the signal strength corresponding to the channel received from each of the one or more of the broadcast content reception devices included in the community of broadcast content reception devices other than the first one of the broadcast content reception devices; and transmitting to the first one of the broadcast content reception devices, via the transceiver, information that identifies the selected one of the one or more of the broadcast content reception devices included in the community of broadcast content reception devices other than the first one of the broadcast content reception devices.

8. The method of claim 7, further comprising:

selecting the selected one of the one or more of the broadcast content reception devices included in the community of broadcast content reception devices other than the first one of the broadcast content reception devices based on:

information indicating the signal strength corresponding to the channel received from each of the one or more of the broadcast content reception devices included in the community of broadcast content reception devices other than the first one of the broadcast content reception devices, and information indicating the number of content items currently being provided to a network by each of the one or more of the broadcast content reception devices included in the community of broadcast content reception devices other than the first one of the broadcast content reception devices.

9. The method of claim 7, further comprising:

selecting the selected one of the one or more of the broadcast content reception devices included in the community of broadcast content reception devices other than the first one of the broadcast content reception devices based on:

information indicating the signal strength corresponding to the channel received from each of the one or more of the broadcast content reception devices included in the community of broadcast content reception devices other than the first one of the broadcast content reception devices, and information indicating the data rate associated with each of the one or more of the broadcast content reception devices included in the community of broadcast content reception devices other than the first one of the broadcast content reception devices.

10. The method of claim 7, further comprising transmitting the information that identifies the channel included in the first request for channel information with the information that identifies the selected one of the one or more of the broadcast content reception devices included in the community of broadcast content reception devices other than the first one of the broadcast content reception devices to the first one of the broadcast content reception devices.

11. The method of claim 7, wherein the request for channel information includes the information that identifies the community of broadcast content reception devices, the method further comprising:

obtaining the community information using the information that identifies the community of broadcast content reception devices;

obtaining information that identifies the one or more of the broadcast content reception devices included in the community of broadcast content reception devices other than the first one of the broadcast content reception devices from the community information; and transmitting the second request for channel information to the one or more of the broadcast content reception devices included in the community of broadcast content reception devices other than the first one of the broadcast content reception devices using the information that identifies the one or more of the broadcast content reception devices included in the community of broadcast content reception devices other than the first one of the broadcast content reception devices.

12. The method of claim 7, further comprising:

receiving, via the transceiver, a third request for channel information from a second one of the broadcast content reception devices included in the community of broadcast content reception devices;

transmitting, via the transceiver, one or more fourth requests for channel information to one or more of the broadcast content reception devices included in the community of broadcast content reception devices other than the second one of the broadcast content reception devices in response to receiving the third request for channel information;

receiving, via the transceiver, information that indicates one or more signal strengths corresponding to one or more channels from each of the one or more of the broadcast content reception devices included in the community of broadcast content reception devices other than the second one of the broadcast content reception devices;

generating a content list including information that identifies a plurality of content items based on the information that indicates the one or more signal strengths corresponding to the one or more channels received from each of the one or more of the broadcast content reception devices included in the community of broadcast content reception devices other than the second one of the broadcast content reception devices; and transmitting, via the transceiver, the content list to the second one of the broadcast content reception devices.

13. The method of claim 12, further comprising:

obtaining information that identifies a plurality of genres respectively corresponding to the plurality of content items; and arranging the information that identifies the plurality of content items included in the content list based on the information that identifies the plurality of genres respectively corresponding to the plurality of content items, wherein the content items that respectively corresponding to each of the genres are grouped together in the information that identifies the plurality of content items included in the content list.

14. A non-transitory processor-readable storage medium that stores at least one of instructions or data, the instructions or data, when executed by at least one processor, cause the at least one processor to perform a method comprising:

storing community information including information that identifies each of the plurality of broadcast content reception devices and information that identifies a community of broadcast content reception devices;

receiving, via a transceiver, a first request for channel information from a first broadcast content reception device included in the community of broadcast content reception devices, the first request for channel information including information that identifies a channel;

in response to receiving the first request for channel information, transmitting, via the transceiver, a second request for channel information to one or more of the broadcast content reception devices other than the first broadcast content reception device based on the community information, the second request for channel information including the information that identifies the channel;

receiving, via the transceiver, information that indicates a signal strength corresponding to the channel from at least one of the one or more of the broadcast content reception devices to which the second request for channel information was transmitted;

selecting a second broadcast content reception device of the one or more of the broadcast content reception devices based on the information that indicates the signal strength corresponding to the channel; and transmitting to the first broadcast content reception device, via the transceiver, information that identifies the second broadcast content reception device.

15. The non-transitory processor-readable storage medium of claim 14, wherein the method further comprises:

selecting the second broadcast content reception device based on:

information indicating the signal strength corresponding to the channel received from the at least one of the one or more of the broadcast content reception devices included in the community of broadcast content reception devices other than the first broadcast content reception device, and information indicating the number of content items currently being provided to a network by the at least one of the one or more of the broadcast content reception devices included in the community of broadcast content reception devices other than the first broadcast content reception device.

16. The non-transitory processor-readable storage medium of claim 14, wherein the method further comprises transmitting the information that identifies the channel included in the first request for channel information with the information that identifies the second broadcast content reception device to the first broadcast content reception device.

17. The non-transitory processor-readable storage medium of claim 14, wherein the request for channel information includes the information that identifies the community of broadcast content reception devices, and wherein the method further comprises:

obtaining the community information using the information that identifies the community of broadcast content reception devices;

obtaining information that identifies the second broadcast content reception device based on the community information; and transmitting the second request for channel information to the second broadcast content reception device based on the information that identifies the second broadcast content reception device.

18. The non-transitory processor-readable storage medium of claim 14, wherein the method further comprises:

receiving, via the transceiver, a third request for channel information from a third broadcast content reception device included in the community of broadcast content reception devices;

in response to receiving the third request for channel information, transmitting, via the transceiver, one or more fourth requests for channel information to at least one of the one or more broadcast content reception devices included in the community of broadcast content reception devices other than the second broadcast content reception device;

receiving, via the transceiver, information that indicates one or more signal strengths corresponding to one or more channels from at least one of the one or more of the broadcast content reception devices included in the community of broadcast content reception devices other than the second broadcast content reception device;

generating a content list including information that identifies a plurality of content items based on the information that indicates the one or more signal strengths corresponding to the one or more channels received from at least one of the one or more of the broadcast content reception devices included in the community of broadcast content reception devices other than the second broadcast content reception device; and transmitting, via the transceiver, the content list to the third broadcast content reception device.

19. The non-transitory processor-readable storage medium of claim 18, wherein the method further comprises:

obtaining information that identifies a plurality of genres respectively corresponding to the plurality of content items; and arranging the information that identifies the plurality of content items included in the content list based on the information that identifies the plurality of genres respectively corresponding to the plurality of content items, wherein the content items that respectively corresponding to each of the genres are grouped together in the information that identifies the plurality of content items included in the content list.

20. The non-transitory processor-readable storage medium of claim 14, wherein the method further comprises:

selecting the second broadcast content reception device based on:

information indicating the signal strength corresponding to the channel received from the at least one of the one or more of the broadcast content reception devices included in the community of broadcast content reception devices other than the first one of the broadcast content reception devices, and information indicating the data rate associated with at least one of the one or more of the broadcast content reception devices included in the community of broadcast content reception devices other than the first one of the broadcast content reception devices.

* * * * *